(12) United States Patent
Sha et al.

(10) Patent No.: US 7,219,173 B2
(45) Date of Patent: May 15, 2007

(54) SYSTEM FOR VIDEO PROCESSING CONTROL AND SCHEDULING WHEREIN COMMANDS ARE UNAFFECTED BY SIGNAL INTERRUPTS AND SCHEDULE COMMANDS ARE TRANSMITTED AT PRECISE TIME

(75) Inventors: Li Sha, San Jose, CA (US); Shuhua Xiang, Fremont, CA (US); Wang Xu, Fremont, CA (US)

(73) Assignee: Micronas USA, Inc., Santa Clara, CA (US)

( * ) Notice: Subject to any disclaimer, the term of this patent is extended or adjusted under 35 U.S.C. 154(b) by 1252 days.

(21) Appl. No.: 10/033,857

(22) Filed: Nov. 2, 2001

(65) Prior Publication Data

US 2005/0223410 A1  Oct. 6, 2005

Related U.S. Application Data

(60) Provisional application No. 60/309,239, filed on Jul. 31, 2001.

(51) Int. Cl.
  G06F 3/00    (2006.01)
  G06F 13/00   (2006.01)
  H04N 5/445   (2006.01)

(52) U.S. Cl. ............... 710/61; 725/35; 725/109; 725/110; 725/111; 725/112; 725/113; 348/563; 348/564; 341/50; 341/51; 341/52

(58) Field of Classification Search .......... 710/61; 725/109–113, 35, 37–61; 386/46; 341/50–52; 348/563, 564
See application file for complete search history.

(56) References Cited

U.S. PATENT DOCUMENTS

| | | |
|---|---|---|
| 4,873,684 A | 10/1989 | Kobayashi et al. |
| 5,187,577 A | 2/1993 | Kim |
| 5,228,130 A | 7/1993 | Michael |
| 5,299,144 A | 3/1994 | Bartkowiak et al. |
| 5,341,492 A | 8/1994 | Sakata |
| 5,361,220 A | 11/1994 | Asano |
| 5,398,078 A | 3/1995 | Masuda et al. |
| 5,633,897 A | 5/1997 | Fettweis et al. |
| 5,694,127 A | 12/1997 | Tayama |
| 5,706,001 A | 1/1998 | Sohn |

(Continued)

*Primary Examiner*—Tammara Peyton
(74) *Attorney, Agent, or Firm*—Michael A. Molano; Mayer, Brown, Rowe & Maw LLP

(57) ABSTRACT

A method, apparatus, computer medium, and other embodiments for synchronizing control of one or more devices at predetermined times are described. A host scheduler loads a to-do list of predetermined events and corresponding time-tags into memory and broadcasts scheduled events to the devices to cause activation of the events on intended devices.

16 Claims, 18 Drawing Sheets

U.S. PATENT DOCUMENTS

| | | |
|---|---|---|
| 5,706,002 A | 1/1998 | Meehan et al. |
| 5,751,282 A * | 5/1998 | Girard et al. ............... 715/721 |
| 5,799,201 A | 8/1998 | Lorenz et al. |
| 5,835,145 A | 11/1998 | Ouyang et al. |
| 5,852,474 A * | 12/1998 | Nakagaki et al. ........... 348/564 |
| 5,941,940 A | 8/1999 | Prasad et al. |
| 6,006,005 A * | 12/1999 | Okitsu ........................ 386/46 |
| 6,038,675 A | 3/2000 | Gabzdyl et al. |
| RE37,048 E | 2/2001 | McCollum |
| 6,209,017 B1 | 3/2001 | Lim et al. |
| 6,243,734 B1 | 6/2001 | Doshi et al. |
| 6,407,680 B1 | 6/2002 | Lai et al. |
| 6,421,094 B1 | 7/2002 | Han |
| 6,421,695 B1 | 7/2002 | Bae et al. |
| 6,463,445 B1 | 10/2002 | Suzuki et al. |
| 6,507,293 B2 | 1/2003 | Deeley et al. |
| 6,516,031 B1 | 2/2003 | Ishihara et al. |
| 6,523,071 B1 | 2/2003 | Klinger et al. |
| 6,552,673 B2 | 4/2003 | Webb |
| 6,587,057 B2 | 7/2003 | Scheuermann |
| 6,591,381 B1 | 7/2003 | Kim et al. |
| 6,593,860 B2 | 7/2003 | Lai et al. |
| 6,647,061 B1 | 11/2003 | Panusopone et al. |
| 6,701,405 B1 | 3/2004 | Adusumilli et al. |
| 6,704,493 B1 | 3/2004 | Gasanov et al. |
| 6,728,862 B1 | 4/2004 | Wilson |
| 6,732,372 B2 * | 5/2004 | Tomita et al. ................ 725/47 |
| 2001/0016884 A1 | 8/2001 | Sato et al. |
| 2002/0015528 A1 | 2/2002 | Kondo et al. |
| 2002/0196855 A1 | 12/2002 | Miyagoshi et al. |
| 2002/0199040 A1 | 12/2002 | Irwin et al. |
| 2003/0014457 A1 | 1/2003 | Desai et al. |

* cited by examiner

| EVENT NUMBER | CLOCK | EXPECTED TIMER |
|---|---|---|
| 0 | 0 | 5 |
| 1 | 1 | 10 |
| 2 | 2 | 25 |
| ⋮ | ⋮ | ⋮ |
| n | n | m |

FIG. 5

Control bus access (read/write)

Valid Schedule Command

SYSTEM FOR VIDEO PROCESSING CONTROL AND SCHEDULING WHEREIN COMMANDS ARE UNAFFECTED BY SIGNAL INTERRUPTS AND SCHEDULE COMMANDS ARE TRANSMITTED AT PRECISE TIME

CROSS-REFERENCE TO RELATED APPLICATION

This application claims priority under 35 U.S.C. § 119(e) to co-pending U.S. Provisional Patent Application, No. 60/309,239, entitled "Video Processing System with Flexible Video Format," filed Jul. 31, 2001, by He Ouyang, et al., the subject matter of which is incorporated by reference in its entirety herein.

TECHNICAL FIELD

The present invention relates generally to video processing, and in particular to the scheduling and control of events performed by multiple devices of a video processing system.

BACKGROUND OF THE INVENTION

With conventional microprocessors (i.e., processor, central processing unit CPU), the issuance of control signals and the initial execution of events at precise times associated with the control and operation of various elements and devices of a video processing system cannot be guaranteed when a signal is generated that consumes the attention of the processor. Typically, such signals are known as interrupts, and are usually generated when input/output (I/O) is required. As an example, hardware interrupts can be generated when a key is pressed or when a control input device such as a mouse is moved. On the other hand, software interrupts can be generated when a program must perform I/O access to a device. When an interrupt occurs, the operating system generally takes control in order to determine the next action to be taken. Such control is undesirable for the current event being undertaken by the processor. Additionally, such interrupts preclude specific anticipated events from occurring until the interrupt control is completed. This is disadvantageous because the overall efficiency of processing events and of completing operations in generally are detrimentally impacted.

Accordingly, it would be beneficial if there were a way to accurately synchronize and control devices and elements of a video processing system in a precise manner. There is a need to improve the efficiency of the processing operations.

SUMMARY OF THE INVENTION

The present invention overcomes the deficiencies and limitations of the prior art by providing a scheduler system for enabling the scheduling and synchronization of operations and data transfers intended to be performed by particular devices at specific predetermined times in an operational cycle. According to one aspect of the present invention, a novel system includes a timing mechanism for scheduling and enabling activation of the devices under the control of a scheduler host device.

In accordance with one embodiment of the present invention, a method of synchronizing control of one or more devices in a system during an operational cycle (e.g., READ, WRITE) is provided. The method includes retrieving data associated with a plurality of predetermined events to be performed by one or more of the devices in the operational cycle. A current event is associated in turn with the predetermined events, and responsive to the current event being associated with a particular event of the predetermined events, the method includes enabling one or more of the devices to perform the particular event.

In accordance with another embodiment of the present invention, a method of controlling at least one operation to be performed at a predetermined time is provided. The method includes receiving a first command transmitted from a host device. The first command is interpreted to synchronize performance of the operation as intended. A second command is received after being transmitted from the host device. The method includes interpreting the second command to determine that the operation may be activated, and responsive to a determination that the operation may be activated, enabling activation of the event at the predetermined time.

In one aspect in accordance with the present invention, the scheduler system ensures the precise control of the timing of operations without the drawbacks associated with conventional interrupt handling.

According to another aspect of the present invention, the scheduler system avoids interrupt handling tasks interfering with the operational cycle. Instead, the interrupt handling is performed independently by a processor controller.

One embodiment in accordance with the present invention includes a master controller (referenced interchangeably as a scheduler or host device), which functions as a server device. Predetermined scheduling data comprising event commands and associated time-tags are loaded and stored in a schedule storage element, which is part of the scheduler host device. At specific times during an operational cycle of the scheduler system, the scheduler host device broadcasts the current event command to the devices, which function as client devices that enable the event to be performed.

The features and advantages described in this summary and the following detailed description are not all-inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The teachings of the present invention can be readily understood by considering the following detailed description in conjunction with the accompanying drawings.

FIG. 5 is an illustration of exemplary events and corresponding execution times that may be stored in the schedule storage element.

Figure 1:
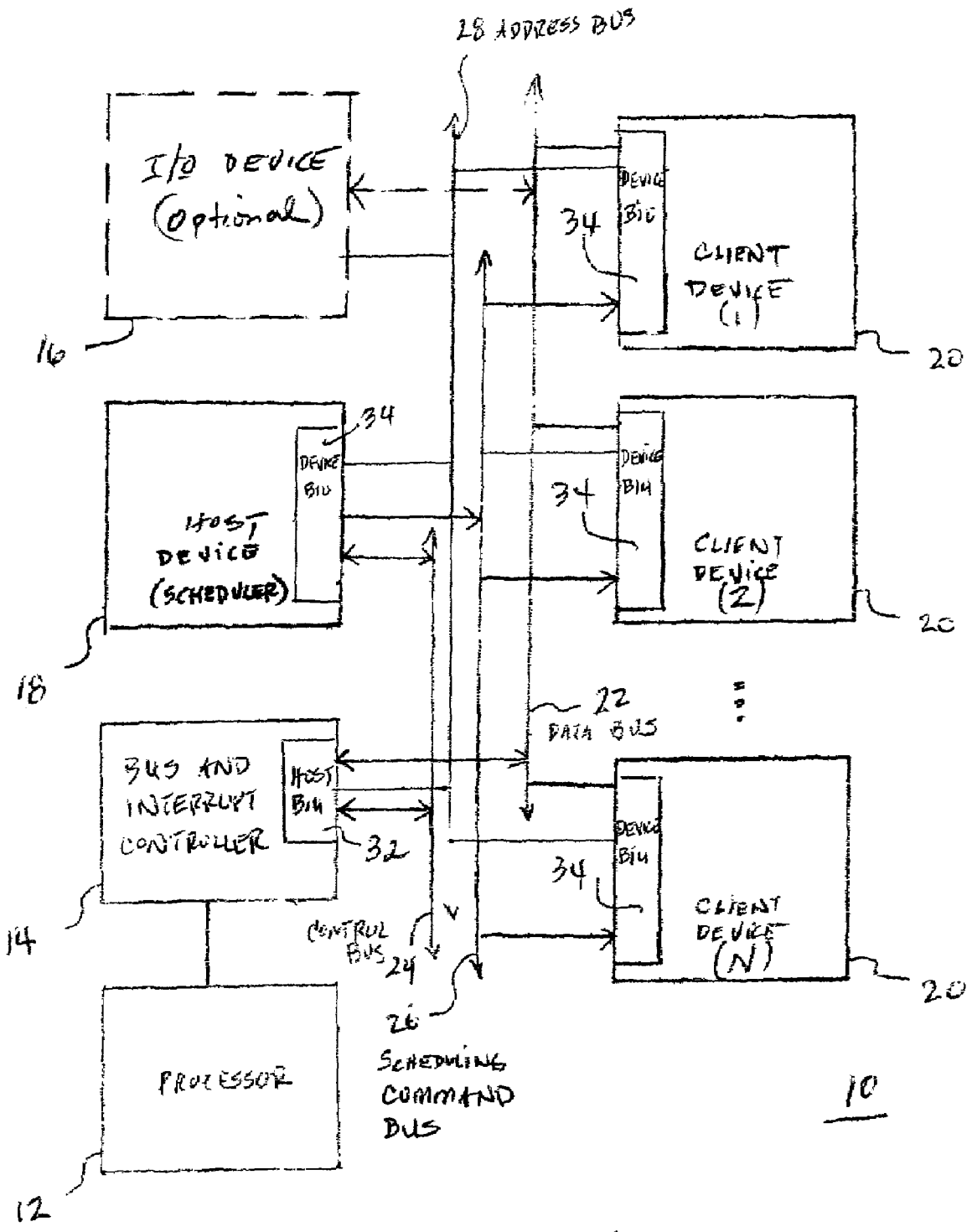
FIG. 1 is a block diagram of a host device and one or more client devices that are part of a scheduler system in accordance with one embodiment of the present invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Introduction

A system, method, and other embodiments for synchronizing and scheduling the timing and execution of processes (operations) and data transfers for various components and elements of a video processing system are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention with unnecessary details.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like. Furthermore, it has also proven convenient at times, to refer to certain arrangements of steps requiring physical manipulations of physical quantities as (modules) code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or determining" or "displaying" or the like, refer to the action and processes of a computer system, or similar electronic computing device, that manipulates and transforms data represented as physical (electronic) quantities within the computer-based system memories or registers or other such information storage, transmission or display devices.

One aspect in accordance with the present invention includes an embodiment of the process steps and instructions described herein in the form of hardware. Alternatively, the process steps and instructions of the present invention could be embodied in firmware or a computer program (software), and when embodied in software, could be downloaded to reside on and be operated from different platforms used by video processing systems and multimedia devices employed with real time network operating systems and applications.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Reference will now be made in detail to several embodiments of the present invention, examples of which are illustrated in the accompanying drawings. Wherever practicable, the same reference numbers will be used throughout the drawings to refer to the same or like parts to avoid obscuring the invention with unnecessary details.

FIG. 1 illustrates a scheduler system 10 in accordance with the present invention. Scheduler system 10 includes a processor 12, a bus and interrupt controller 14, an optional input/output (I/O) device 16, (scheduler) host device 18, and one or more client devices 20 (1 through N, where N is an integer, and referred to generally as client devices 20 or devices 20). System 10 also includes at least three types of buses, namely a data bus 22, a control bus 24, a (scheduling) command bus 26, and an address bus 28.

By way of example, data bus 22 can be 32-bits wide with 23-bit address space used in association with a READ request, a WRITE request, a last transfer signal and a transfer acknowledge signal. Buses 24 and 26 each comprises a 16-bit control or command bus, used in association with a WRITE request, a READ request, a last transfer request, request acknowledge, interrupt, and interrupt acknowledge signals. Where predetermined amounts of data are expected to be transferred between the host device 18 and the devices 20, the command bus 26 can include a 12-bit scheduling counter to monitor on-the-fly the amount of data that has been transferred.

Figure 2:
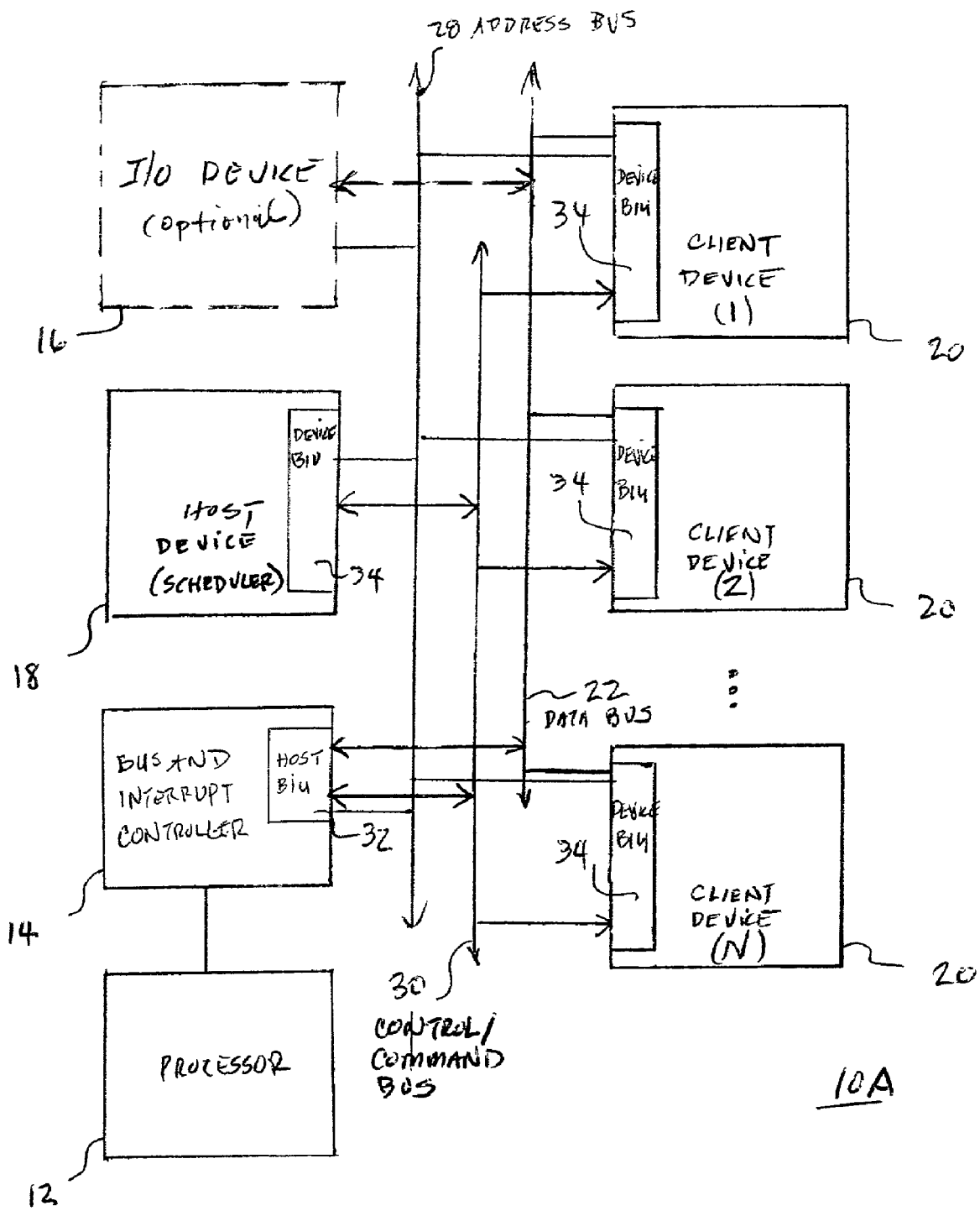
FIG. 2 is a block diagram of a host device and one or more client devices that are part of a scheduler system in accordance with another embodiment of the present invention.

It will be understood that the present invention will work suitably well with other bus arrangements, and is not limited by the particular implementation described. For example, in an alternate embodiment in accordance with the present invention, the control bus 24 can be modified to include the functions of the scheduling command bus 26. FIG. 2 illustrates a particular implementation of this alternate embodiment where in a scheduler system 10A, a control/command bus 30 has replaced buses 24 and 26 of FIG. 1. This alternate embodiment avoids the additional routing associated with a separate command bus 26, which is advantageous for System-on-Chip (SoC) and Application Specific Integrated Circuit (ASIC) applications where integrated circuits increasingly require compact and stream-lined designs. It will become apparent to those skilled in the art that with such alternate embodiments and other implementations, appropriate modification to the timing and control process described herein should be made. In the description to follow, reference to the embodiment of FIG. 1 will be made primarily: to avoid obscuring the invention with additional details; and with the understanding that the general techniques described can be applied to various embodiments and implementations of scheduler system 10.

Processor 12 is a central processing unit (CPU) or microprocessor. In general, processor 12 may be any suitable microprocessor with on-chip memory for encoding subsampled video signals, such as an Intel i860 pixel processor, programmed to implement the video processing techniques in accordance with the present invention. When system 10 is used by Very Large Scale Integration (VLSI), ASIC and SoC applications, it is preferable to use components that keep the manufacturing costs of system 1 low. According to one implementation that helps to keep manufacturing costs low, processor 12 is selected to be a RISC-based CPU capable of facilitating the transfer of blocks of data, and of handling interrupts which may be initiated by the hardware or software. Other general parameters associated with providing a low cost processor 12 include having a 16-bit arithmetic logic unit (ALU), an 18-bit instruction set, and an operating speed up to 100 MHz. Processor 12 is communicatively coupled to the bus and interrupt controller 14. It is noted that the present invention is not limited to working with processors having low manufacturing costs or with the parameters described here, but will work suitably well with a variety of other processors.

Figure 17:
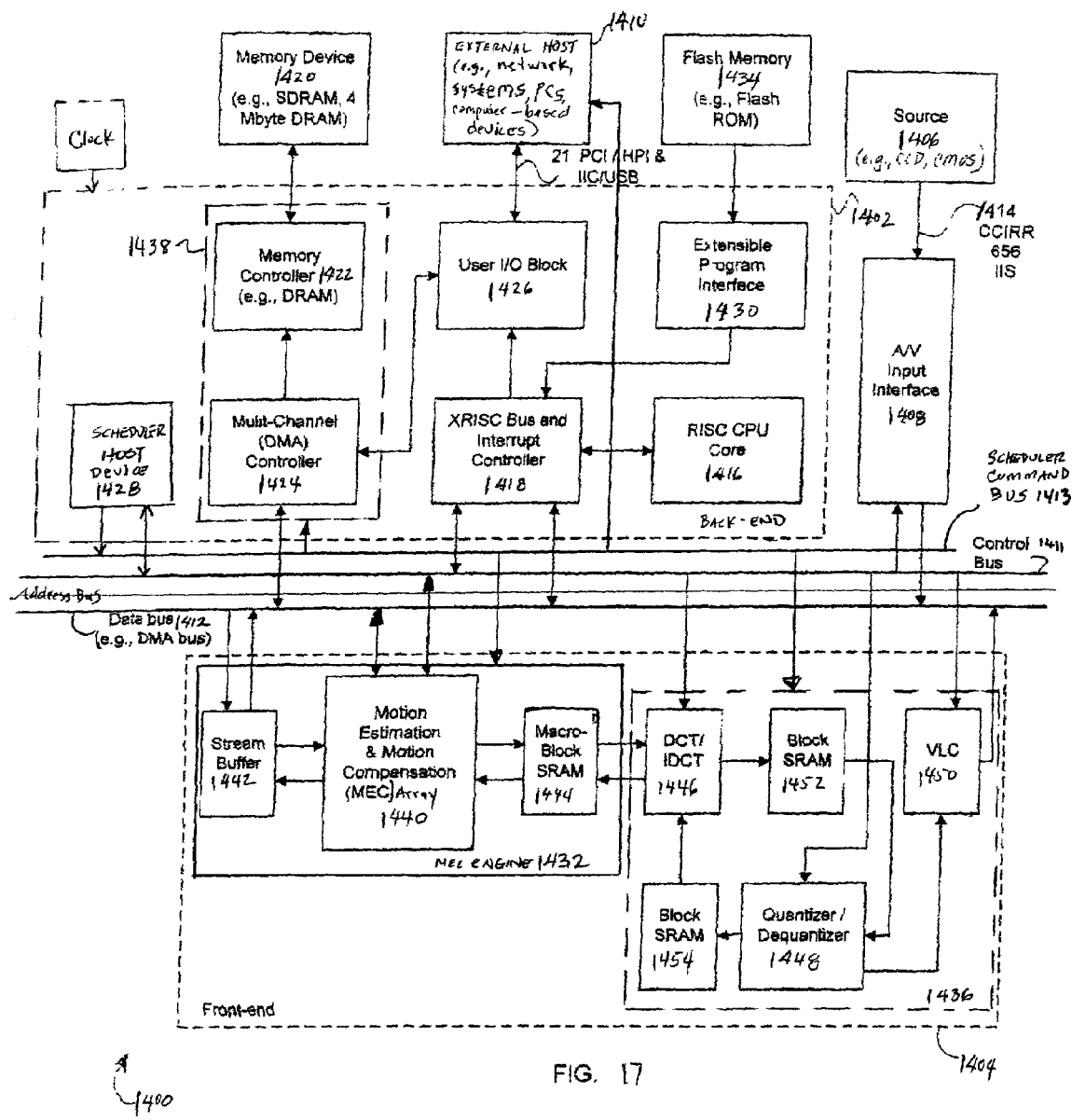
FIG. 17 is detailed block diagram of one embodiment of a video processing system well-suited for use with the scheduler system of FIG. 1.

The bus and interrupt controller 14 (referred to interchangeably as "controller 14" for convenience) is the internal controller of system 10. Controller 14 is responsible for generating internal interrupts, and for handling such interrupts. By way of example, such interrupts may be hardware and software interrupts, in addition to the externally generated interrupts described. In general, controller 14 will interpret commands, and although not shown explicitly, will perform interrupt handling, which may involve configuring necessary registers, setting associated result registers and an acknowledge register, if necessary. Where the source of the interruption is caused externally to system 10, controller 14 accepts such interruption through I/O device 16, provides the interrupt handling as described, and then generates an external interrupt to acknowledge the initial interrupt command. For example, controller 14 can generate an external interrupt in the Host Parallel Interface (HPI), or an interruption package associated with a Universal Serial Bus (USB) port, both of which are suitable techniques used by I/O device 16. In one embodiment in accordance with the present invention, controller 14 is an XRISC bus and interrupt controller handling the workflow of the data and control signals for the computing processes of processor 12. Further details about the XRISC bus and interrupt controller will be described subsequently in the description of FIG. 17, illustrating the particular implementation of a video processing system 1400 using the scheduler system 10.

The controller 14 includes a host bus interface unit 32 (referred to interchangeably as host BIU 32 or interface 32) enabling the controller 14 to communicate with the control bus 24. Additionally, host BIU 32 enables the host device 18 to be configured and modified when needed through command bus 26, as will be described in more detail later. The host device 18 and the client devices 20 each includes a device BIU 34. In general, reference will be made interchangeably to the BIU 34 or interface 34 for convenience. Device BIU 34 will be described in further detail when referencing the process steps of FIG. 11, and when referencing a particular A; hardware implementation described in FIG. 8, subsequently. At times during the discussion herein, the host device 18 will be referred to as the "scheduler," from which it will be understood that the host device 18 generally provides a timing mechanism enabling the scheduling and synchronization of operations and data transfers intended to be performed by particular ones of the devices 20.

Figure 3:
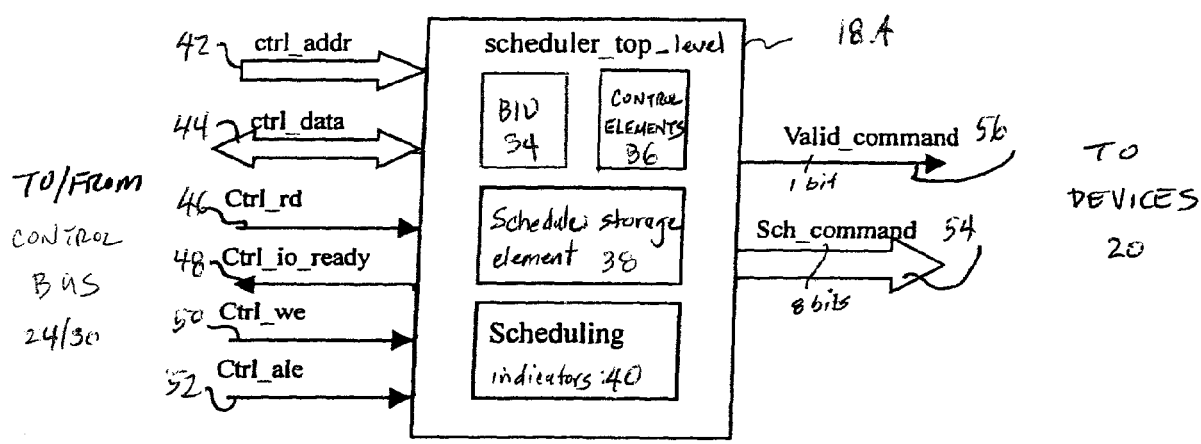
FIG. 3 is a block diagram of one embodiment the host device in accordance with the present invention.

Reference is now made to the top-level block diagram of FIG. 3, illustrating one embodiment of a host device 18A. In the embodiment shown, host device 18A includes a device bus interface unit (BIU) 34, control elements 36, a schedule storage element 38, and a plurality of scheduling indicators 40. Various data, control and address signal lines communicatively couple the controller 14 with the input of host device 18A. These signal lines disposed at the input side of the host device 18A include control address (ctrl_addr) lines 42, control data (ctrl_data) lines 44, control_read (Ctrl_rd) line 46, control input output ready (Ctrl_io_ready) line 48, control write enable ($ctrl_{13}$ we) line 50, and control address latch enable (Ctrl_ale) line 52. Although not shown explicitly in FIG. 3, these signal lines 42, 44, 46, 48, 50 and 52 are coupled to the bus interface unit 34. Host device 18A also includes two types of outputs, namely output signal line 54 providing a schedule (event) command, and output signal line 56 providing a valid signal pulse. These signals 54, 56 will be further described subsequently with reference to FIG. 13.

Figure 4:
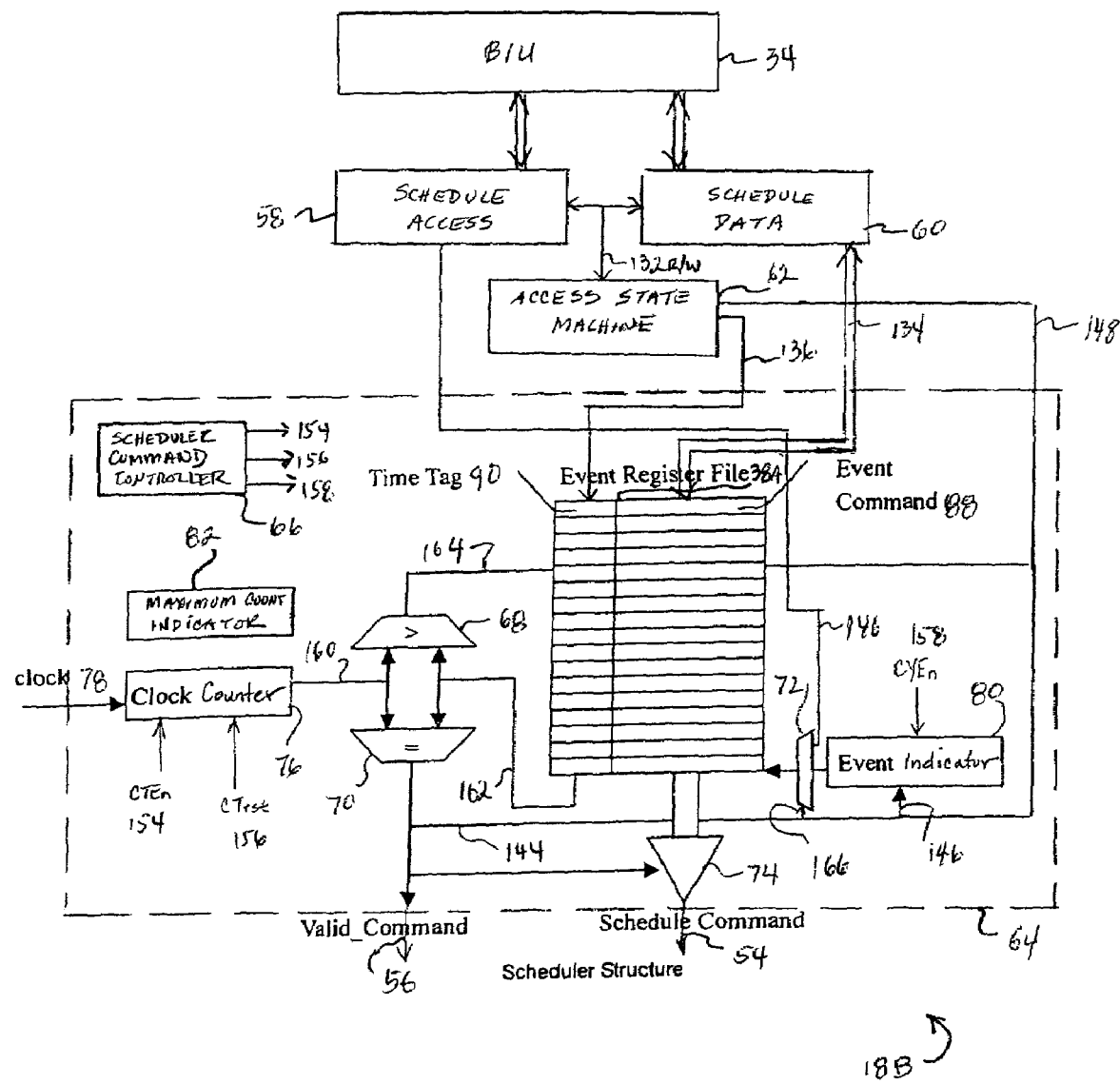
FIG. 4 is a detailed block diagram of a particular embodiment for the host device of FIG. 3.

Referring to FIG. 4, further details of the host device will be now described regarding the particular embodiment shown. It should be noted that the embodiment of host device 18B of FIG. 4 is one particular implementation, that the present invention is not limited to the embodiment of the host device of FIG. 4, and that other implementations will work suitably well in accordance with the present invention. Host device 18B includes a plurality of control elements generally represented in FIG. 3 by control elements 36. For example, host device 18B includes a schedule access element 58, a schedule data storage element 60, and an access state machine 62. Schedule access element 58 and schedule data storage element 60 are both communicatively coupled to the bus interface unit 34. Coupled to the schedule access element 58 and to the schedule data storage element 60 is access state machine 62. Host device 18B further includes additional control elements 36, a schedule storage element 38, and scheduling indicators 40, generally represented by FIG. 3, and collectively represented by control engine 64 shown with a dashed line.

Control engine 64 comprises additional control elements in the nature of a scheduler command controller 66, a first detector 68, a second detector 70, selection element 72, and a buffer 74. Furthermore, control engine 64 comprises scheduling indicators in the nature of a clock counter 76 receiving a clock signal 78, a current event indicator 80, and a maximum count indicator 82. Control engine 64 is communicatively coupled to the schedule access element 58, schedule data element 60, and the access state machine 62, as will be described in more detail subsequently. Having introduced the components of host device 18B shown in FIG. 4, further details of such components will now be described.

Reference is now made to the illustration of FIG. 5, showing a schedule 84 of events that can be stored by the schedule storage element 38. In general, the schedule shown in FIG. 5 comprises a time-tagged "to-do" list of events 86 to be performed by devices 20. These events 86 are preferably stored sequentially in increasing order by time-tag. By way of example, the schedule 84 of FIG. 5 can be interpreted to mean that in an operational cycle having n clocks, a certain number of events, n, occur. Each of the events are to occur at an expected time, m, denoted by the corresponding time-tag for a particular event. It will be understood by those skilled in the art of logic design, that the variables n and m are integers.

Figure 6:
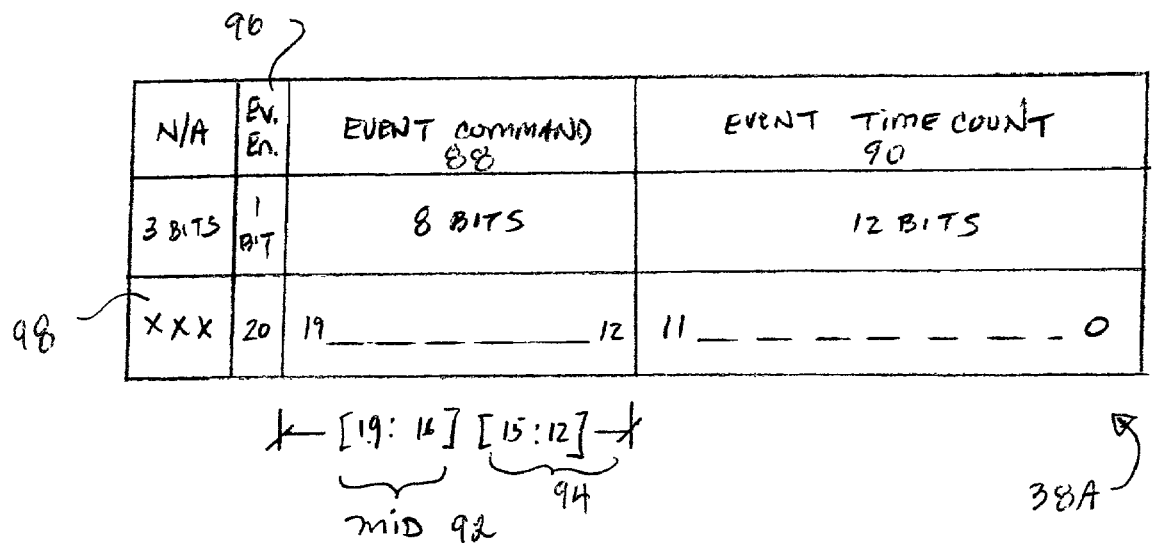
FIG. 6 is diagram illustrating one implementation of a configuration register bitmap for a schedule storage element.

Reference is now made to FIG. 6, which illustrates an exemplary event register bitmap of one register of a 24-bit event register file 38A representing the schedule 84 stored by the schedule storage element 38. It is noted that FIG. 6 shows the configuration bitmap of the event register file 38A corresponding to one row of the predetermined scheduling data shown in FIG. 5. As shown in FIG. 6, the event register file 38A comprises certain bits used to represent the event commands 88 and their associated time-tags 90. Those 12-bits referenced as the Event Time Count 90 represent the time-tags 90. The event commands 88 are, in general, device-specific, and are represented by 8-bits entitled Event Command in FIG. 6. The uppermost 4-bits (e.g., bits 19:16) of the event commands 88 represent the module identifier (MID) 92. The MID 92 represents an identifier specifying the particular device(s) 20 to which the corresponding event command 88 is intended to be performed. The lowermost 4-bits (e.g., bits 15:12) of the event commands 88 represent the command (e.g., operations and data transfers) 94 to be performed. For example and as will be understood from the description of FIG. 17, exemplary event commands 88 that can be performed in a video processing system include motion estimation and compensation, discrete cosine transform (DCT), inverse DCT, quantization, inverse quantization, and video length encoding, by way of example. Reference is made to Table 1, which includes an exemplary bitmap of those 8-bits representing the event commands C7:C0, by way of example.

TABLE 1

| | | | Event Command | | | | |
|---|---|---|---|---|---|---|---|
| E19 | E18 | E17 | E16 | E15 | E14 | E13 | E12 |
| C7 | C6 | C5 | C4 | C3 | C2 | C1 | C0 |

Referring back to FIG. 6, the 24-bit event register file 38A further includes an event enable bit 96 indicating that the event command 88 is valid and being transmitted to the devices 20. The event enable bit 96 is used to enable or disable an event command stored in the schedule storage element 38. When the event enable bit 96 is set to 1, the corresponding event command 88 will activate when its associated time-tag 90 matches with the current clock counter 76, otherwise, the event command 88 should be skipped. The remaining bits (e.g., 3-bits) 98 of the event register file 38A can be utilized for other purposes that arise, and otherwise are "don't cares."

Figure 7:
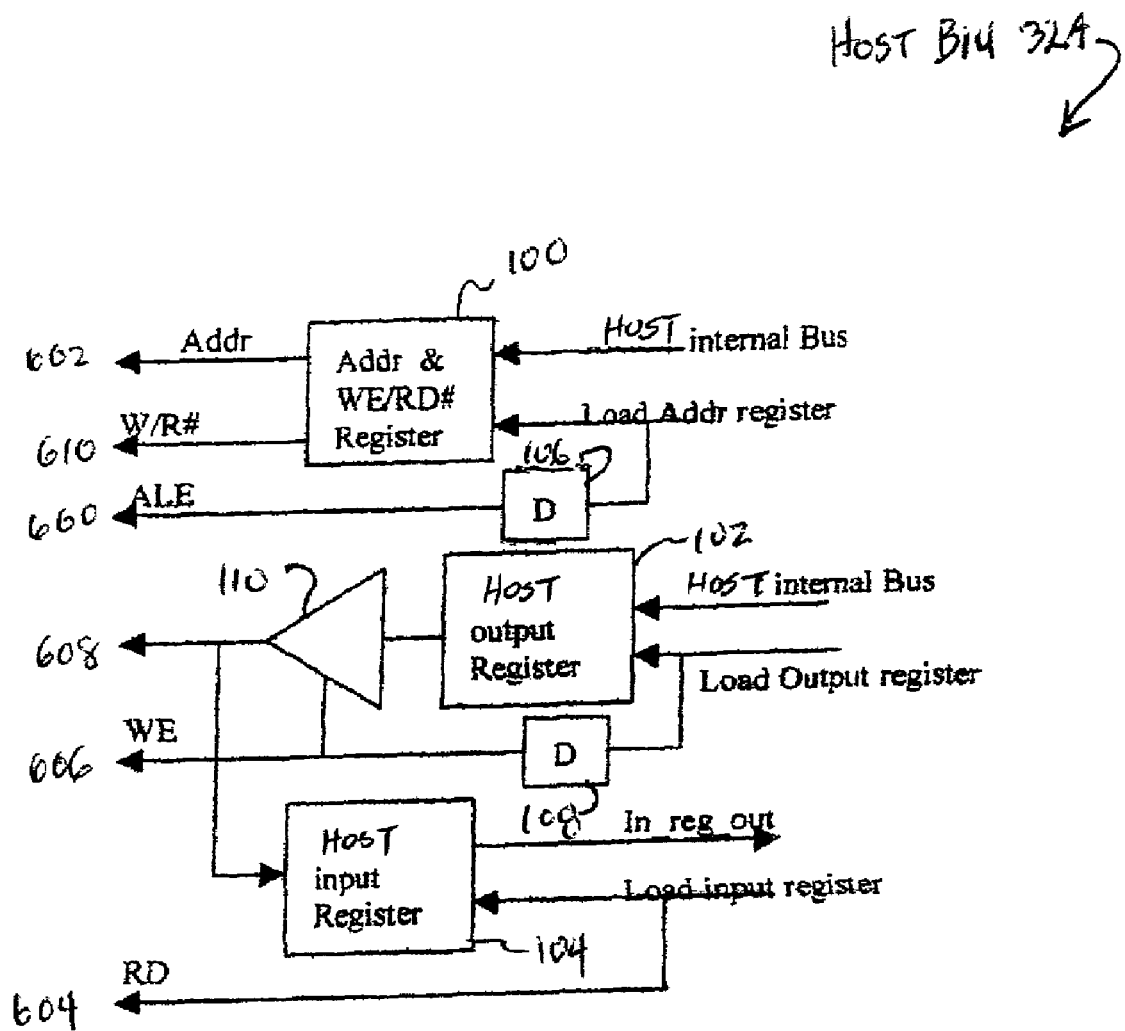
FIG. 7 is a particular hardware implementation of a host bus interface unit.

FIG. 7 shows an exemplary implementation of the host BIU 32A for the host device 18. Host BIU 32A generally buffers the signals being communicated between the host device 18 and the command bus 26, 30. Host BIU 32A includes an address and write enable/read number (WE/RD#) register 100, an output register 102, an input register 104, delay devices 106, 108, and a buffer 110. As will be described in more detail subsequently, in connection with READ and WRITE protocols, data should be latched from the command bus 26, 30 or placed on the command bus at designated times (e.g., clocks).

Figure 8:
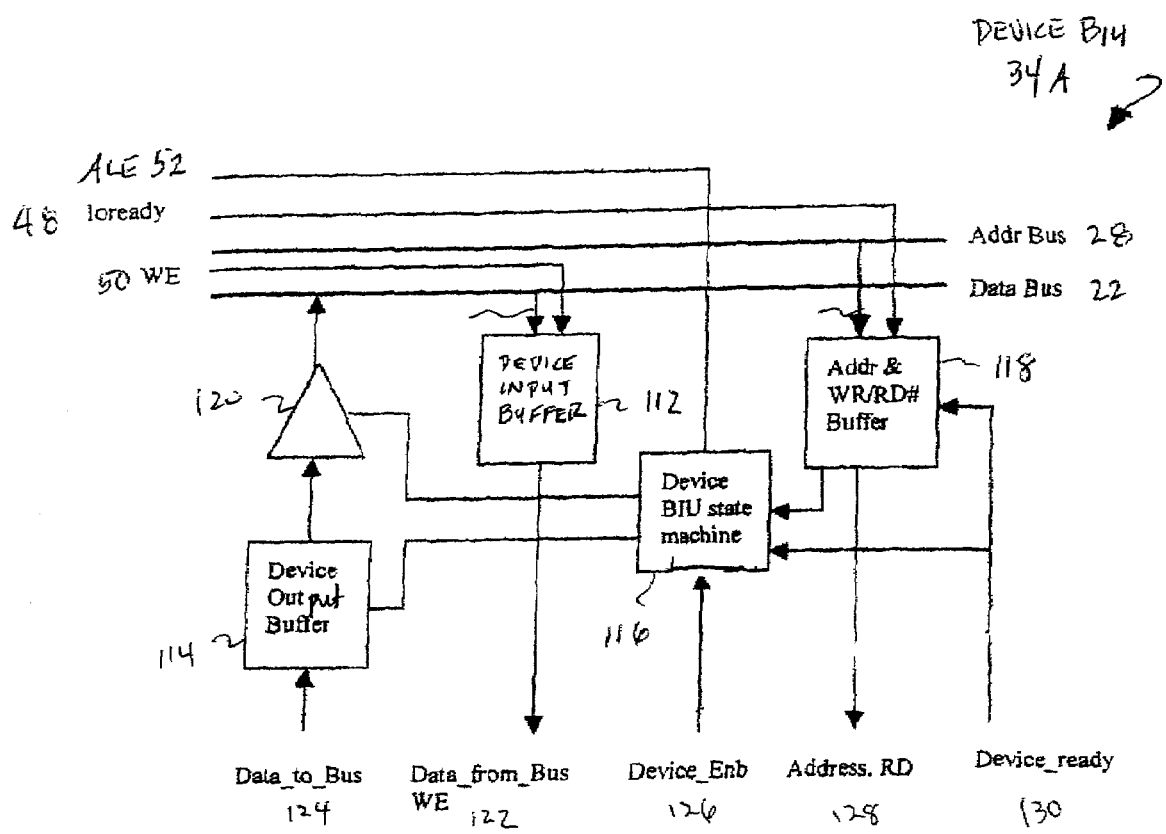
FIG. 8 is a particular hardware implementation of the device bus interface unit.

FIG. 8 shows an exemplary implementation of the device BIU 34A for the devices 20 of FIGS. 1–2. Device BIU 34A includes an input buffer 112, an output buffer 114, a device bus interface unit (BIU) state machine 116, an address and write/read number buffer (WR/RD#) 118, and buffer 120. Once data is latched into the input buffer 112, at another clock, the data is written to internal registers (not explicitly shown) for the device 20 along the data from bus write enable (Data_from_Bus_WriteEnable) signal 122. On the other hand, data read from the device 20 is placed into output buffer 114 from the internal registers along the data to bus ($Data_{13}$ to_Bus) signal 124. A device enable (Device_Enb) signal 126 indicates to the BIU state machine 116 whether the device 20 will drive the tristate data bus 10. An address read (Address.RD) signal 128 indicates that the host device 18 has placed the address on the address bus 28, and a device ready (Device_ready) signal 130 indicates whether the device 20 has put the data on the Data_to_Bus signal 124 so that the BIU state machine 116 may enable the data to be latched onto the tristate bus 22 in the next clock. Further details of the operation of the device BIU 34A will be described subsequently. The Write Enable (WE) signal 50 indicates when the device 20 should latch WRITE data.

Referring back to FIG. 4, according to one embodiment of host device 18B, the schedule access element 58 and the schedule data storage element 60 each comprises a register. The schedule access element 58 and the schedule data element 60 enable the controller 14 to access the event register file 38A. For example, data from the command bus 26, 30 can be loaded into the scheduled storage element 38A by first having the device BIU 34 receive a set of predetermined event commands 88 and associated time-tags 90, collectively referred to as the "predetermined scheduling data", which are temporarily stored in the register representing the schedule data element 60. The schedule access element 58 indicates a READ or WRITE (R/W) signal along line 132 to notify the state access machine 62 of either state. Control address and write enable information are also received by the device BIU 34 from controller 14, temporarily buffered in the register representing the schedule access element 62, and selected as indicated by signal line 132 when the predetermined scheduling data is loaded (i.e., written) into the event register file 38A. Additional details regarding the data loaded into the event register file 38A by controller 14 will be described subsequently.

Reference is now made to Table 2, which includes an exemplary bitmap of a 16-bit register representing the schedule access element 58, by way of example. In the register bitmap of Table 2, data bit 15 (D15) represents the Command or Time bit (C/T bit). The C/T bit indicates which part of an event in the event register file 38A is to be accessed. When the C/T bit is a one (1), the higher 9-bits of the register can be accessed from the (scheduling) command bus 26 via the register representing the scheduler data element 60. These higher 9-bits include the Event Enable bit 96 and those 8-bits representing the Event command 88 shown in FIG. 6. Otherwise, when the C/T bit is a zero (0), the lower 12-bits associated with the event time-tag 90 should be accessed. Other bits in Table 2 indicated by the reference to "dc" represent don't care bits.

schedule data element 60 can be implemented as a 16-bit data register to facilitate the controller 14 accessing the event register file 38A to WRITE data thereto. With this implementation, the predetermined scheduling data is loaded into the event register file 38A prior to a WRITE command being issued to the schedule access element 58. During a READ operation, selected predetermined scheduling data can be read out from the event register file 38A to the register representing the schedule data element 60 after a READ command has been issued to the schedule access element 58.

The schedule storage element 22 generally stores the predetermined scheduling data. The predetermined scheduling data generally comprises a list of: predetermined schedule events ("event commands 88") to be performed by one or more of the devices 20 in an operational cycle; and associated time-tags 90. The event commands 88 comprise those operations (e.g., data transfers) that are to be performed by intended devices 20 at predetermined times defined by the associated time-tags 90. Furthermore, a time-tag 90 will be understood by those skilled in the art to mean a time-stamp relative to the clock input 78.

Access state machine 62 comprises a device for monitoring a variety of operational states for the host device 18 and for handling possible conflicts that arise when one operation (e.g., controller 14 attempts to update the schedule storage element 38) is undertaken contemporaneously with another operation (e.g., the schedule storage element 38 being accessed by the event indicator 80). Access state machine 62 is coupled to the event register file 38A via signal line 136, entitled write_enable. Further details about the operation of the access state machine 62 will now be described.

Figure 9:
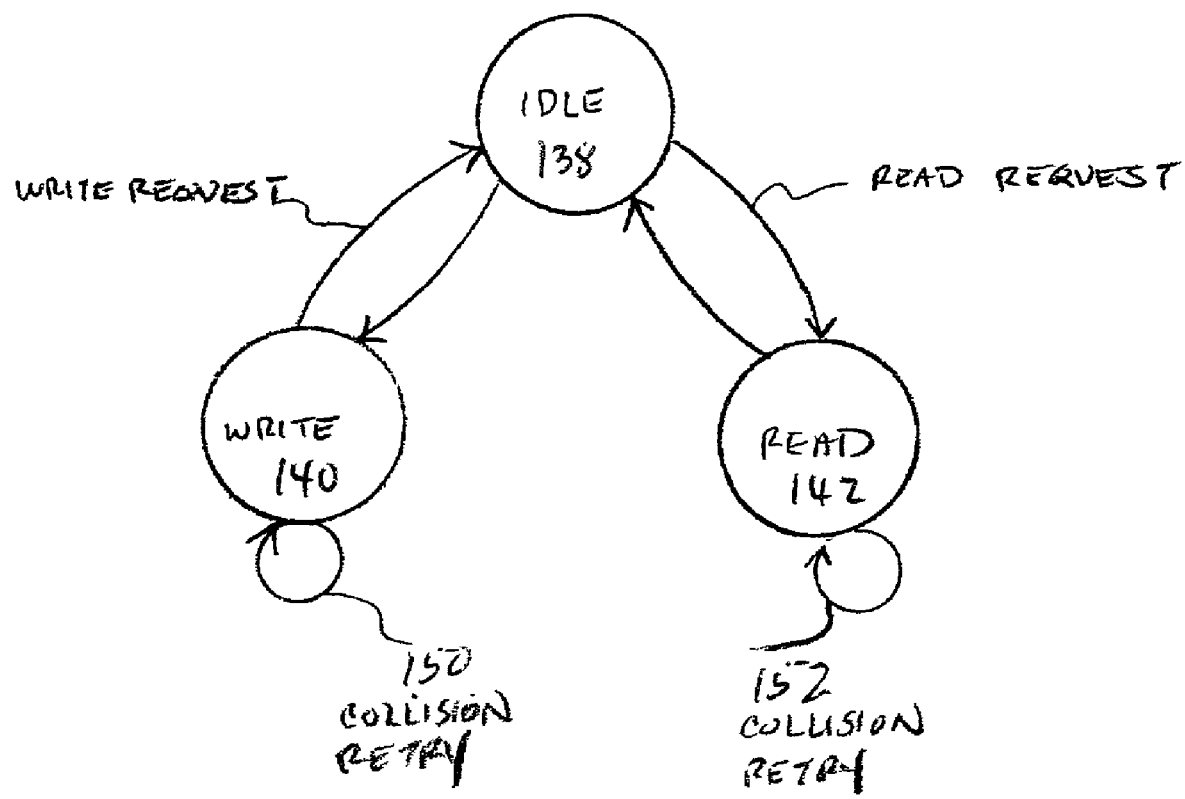
FIG. 9. is a state diagram of the scheduler system in accordance with an aspect of the present invention.

Reference is made to FIG. 9 illustrating a state diagram showing three exemplary states of access state machine 62, namely IDLE 138, WRITE 140 and READ 142. These states represent a particular operation of the scheduler system 10. Access state machine 62 may be designed using a variety of known state-oriented techniques, including decision tables, finite-state mechanism, Petri nets, and transition tables, by way of example. The state diagram of FIG. 9 indicates the process flow for the arbitration of conflicts arising. One aspect of arbitrating such conflicts in accordance with the present invention includes the collision retry scheme shown in FIG. 9.

TABLE 2

Exemplary Register Bitmap of Schedule Access Element

| D15 | D14 | D13 | D12 | D11 | D10 | D9 | D8 | D7 | D6 | D5 | D4 | D3 | D2 | D1 | D0 |
|-----|-----|-----|-----|-----|-----|-----|-----|-----|-----|-----|-----|-----|-----|-----|-----|
| C/T | Ev6 | Ev5 | Ev4 | Ev3 | Ev2 | Ev1 | Ev0 | dc | dc | dc | dc | dc | Dc | dc | wrj |

Still referring to Table 2, data bits 8 through 14 (D14:D8) represent the event numbers, Ev6:Ev0, respectively. With 7-bits representing the total number of events, the register having a bitmap of Table 2 is capable of storing a total of $2^7=128$ possible events.

Referring to FIG. 4, schedule data element 60 is bidirectionally coupled to the event register file 38A via data lines 134. Data lines 134 are bidirectional in order to facilitate the loading of the predetermined scheduling data by the controller 14 into the event register file 38A, and to enable controller 14 to READ scheduling data from the event register file 38A, for example, in those situations where debugging and testing of the system 10 is undertaken. The To understand the collision retry scheme, reference is now made to FIG. 4, where signal 144 indicates that a match has occurred. Signal 144 is received by the selection element 72 to select the current event as a priority over the signal line 146. Signal 144 is also provided over signal line 146 to event indicator 80 to increase the current event count by one. Furthermore, signal 144 is provided over signal line 148 to the access state machine 62 to indicate a possible collision. For example, if the access state machine 62 is in the READ state 142 or WRITE state 140, and receives a signal along signal line 148, the access state machine 62 detects a collision, and will retry 150,152 the appropriate respective operations 140,142 again as shown in FIG. 9. Alternatively, and instead of the collision retry scheme, an arbitration-before-access scheme may be used to prevent collisions by predicting the collision before it occurs.

Referring back to FIG. 4, scheduler command controller 66 provides three control signals, namely Counter Enable (CTEn) signal 154, Counter Reset (CTRst) signal 156, and Cycle Enable signal (CYEn) 158. As described later, scheduler command controller 66 facilitates the access by controller 14 to the clock counter 76 and various cycle logic. One embodiment in accordance with the present invention includes the scheduler command controller 66 implemented as a register, from which the three control signals, CTEn 154, CTRst 156, and CYEn 158, are provided. In that embodiment and by way of example, Table 3 below indicates an exemplary bitmap of a 16-bit register representing the scheduler command controller 66. The unused bits of the register indicated by Table 3 are "don't cares."

TABLE 3

Register Bitmap of Scheduler Command Controller

| D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|
| dc | dc | dc | dc | dc | dc | dc | dc | dc | dc | dc | dc | dc | CYEn | CTEn | CTrst |

Clock counter 76 receives clock signal 78 and several control signals, namely CTEn 154 and CTrst 156. In one implementation, clock counter 76 can be represented as a register. Referring to Table 4, an exemplary bitmap of a 16-bit register representing the clock counter 76 is indicated with data bits D0 through D11 (D11:D0). Although the uppermost 4-bits (D15:D12) are unused and represented with "don't cares" (dc) in Table 4, with the remaining 12-bits representing a total number of clock counts, C11:C0, a possible $2^{12}=4095$ clock counts can be represented in this register. The register for the clock counter 76 can be READ from or WRITTEN to by the scheduler command bus 26, 30, preferably at any time.

TABLE 4

Register Bitmap of Clock Counter

| D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|
| dc | dc | dc | dc | C11 | C10 | C9 | C8 | C7 | C6 | C5 | C4 | C3 | C2 | C1 | C0 |

Other control elements and scheduling indicators of FIG. 3 will now be described in more detail with respect to FIG. 4. First detector 68 functions to detect when a time-tag 90 of the current event 88 is outside of a predetermined range of time-stamps for a given operational cycle. One implementation of first detector 68 includes a comparator, which accepts signals 160, 162 from the clock counter 76 and the time-tag 90 that is associated with the last event command 88 stored in the event register file 38A, respectively. The comparator representing the first detector 68 outputs a signal 164 that is received by the event register file 38A, and that is used to disable that particular event for which a corresponding time-tag 90 is outside of a predetermined range associated with the operational cycle.

The second detector 70 functions to detect when a time-tag 90 of an event command 88 stored in the event register file 38A matches the current event represented by the event indicator 80. One implementation of second detector 70 includes a comparator, which accepts signals 160, 162 from the clock counter 76 and the time-tag 90 that is associated with the last event command 88 stored in the event register file 38A, respectively. The comparator representing the second detector 70 outputs a signal 144. Signal 144 is provided to the selection element 72, to the current event indicator 80, and to the access state machine 62. Signal 144 is provided to the output buffer 74 and is synchronized to be transmitted as the valid command 56 from the host device 18B shortly after transmission of the event command 88 in the schedule command 54. Transmitting the valid command 56 onto the command bus 26 causes the device 20 to activate the current event.

Buffer 74 holds the event command 88 to be broadcast to the devices 20 from the host device 18B. When the command bus 26 becomes available, the event command 88 temporarily stored in buffer 74 can be placed on the tristate command bus 26 to be transmitted from the host device 18B to the devices 20. Buffer 74 also receives the output of second detector 70 in order to synchronize the timing of the event command 88 being provided on the command bus 26, followed by a signal pulse representing the valid command 56. Those of ordinary skill in the art will recognize that buffer 74 can be formed using any suitable memory element for temporarily storing data, such as RAM and register memory, by way of example.

Event indicator 80 represents the current event, that is, a selected one of the predetermined number of event commands 88 stored in the event register file 38A, and that is scheduled to be performed by one of the devices 20. Event indicator 80 may be implemented in a variety of ways, including using a pointer to a data structure. Event indicator 80 receives the CYEn signal 158, as well as the output of comparator 70 along signal line 146.

Selection element 72 is controlled by signal line 166 to select one of two inputs, namely from the schedule access element 58 and from the event indicator 80. As will be described in more detail subsequently, the element 72 selects: (1) one of the predetermined event commands 88 stored in the event register file 38A; or (2) a signal from the schedule access element to update the event register file 38A with new predetermined scheduling data. Those skilled in the art will appreciate that selection element 72 can be implemented in a variety of ways, such as using a multiplexer, by way of example.

Maximum count indicator 82 specifies the maximum number of clock counts in an operational cycle of system 10. Those skilled in the art will appreciate that maximum count indicator 82 can be implemented as a register, or by other known techniques. Table 5 indicates an exemplary bitmap for a 16-bit register representing the maximum count indicator 82. Those values in Table 5 that are unused are noted with don't cares, "dc", and M11:M0 represent the maximum count values.

TABLE 5

Register Bitmap of Maximum Count Indicator

| D15 | D14 | D13 | D12 | D11 | D10 | D9 | D8 | D7 | D6 | D5 | D4 | D3 | D2 | D1 | D0 |
| --- | --- | --- | --- | --- | --- | --- | --- | --- | --- | --- | --- | --- | --- | --- | --- |
| dc | dc | dc | Dc | M11 | M10 | M9 | M8 | M7 | M6 | M5 | M4 | M3 | M2 | M1 | M0 |

The process of one embodiment for implementing the present invention will now be discussed in conjunction with the flowcharts of FIGS. 10–11 and timing diagrams of FIGS. 12–14. Throughout these figures, the sequence of method steps reflect an order in which an aspect in accordance with the present invention is preferably practiced.

When the host device 18B is used with a video processing system, generally, the host device 18B can be designed to operate approximately at a 2400 clock macro block operational cycle, by way of example. Many of the events are activated periodically as the operational cycle turns, that is, repeats. In certain situations, the controller 4 may require the scheduler 18B to stop its operational cycle. When a zero (0) is written to the bit representing the Cycle Enable signal 158 in the scheduler command controller 66, the host device 18B stops its operation when the clock counter 76 reaches a value that matches the time-stamp associated with the maximum count indicator 82. To resume the operational cycle, a one (1) can be written to the bit representing the CYEn signal 158. When system 10 is reset, the bit for CYEn 158 can be set to zero (0).

Figure 10:
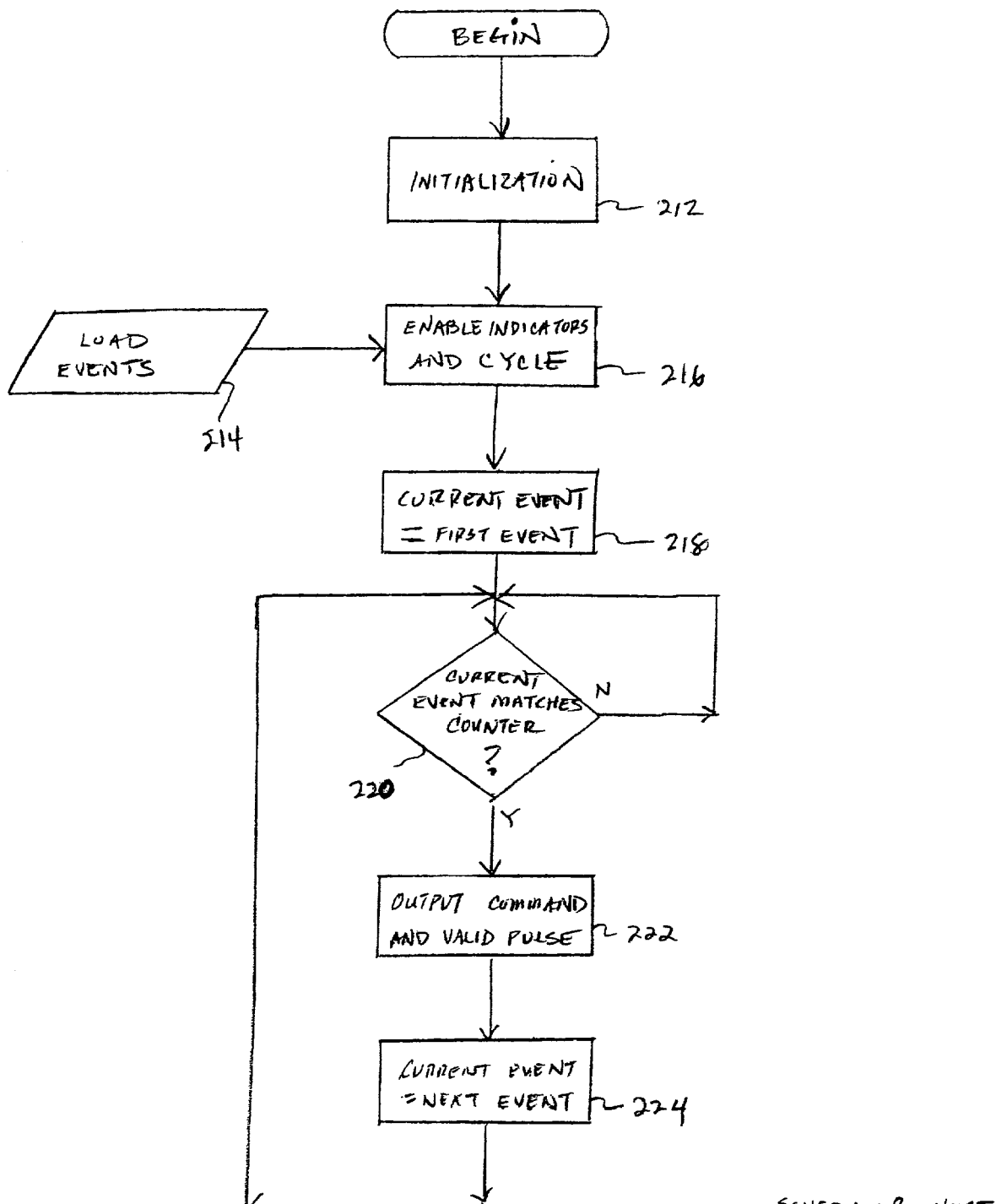
FIG. 10 is a flow chart of one embodiment of an exemplary process that the host device is capable of performing.
Figure 11:
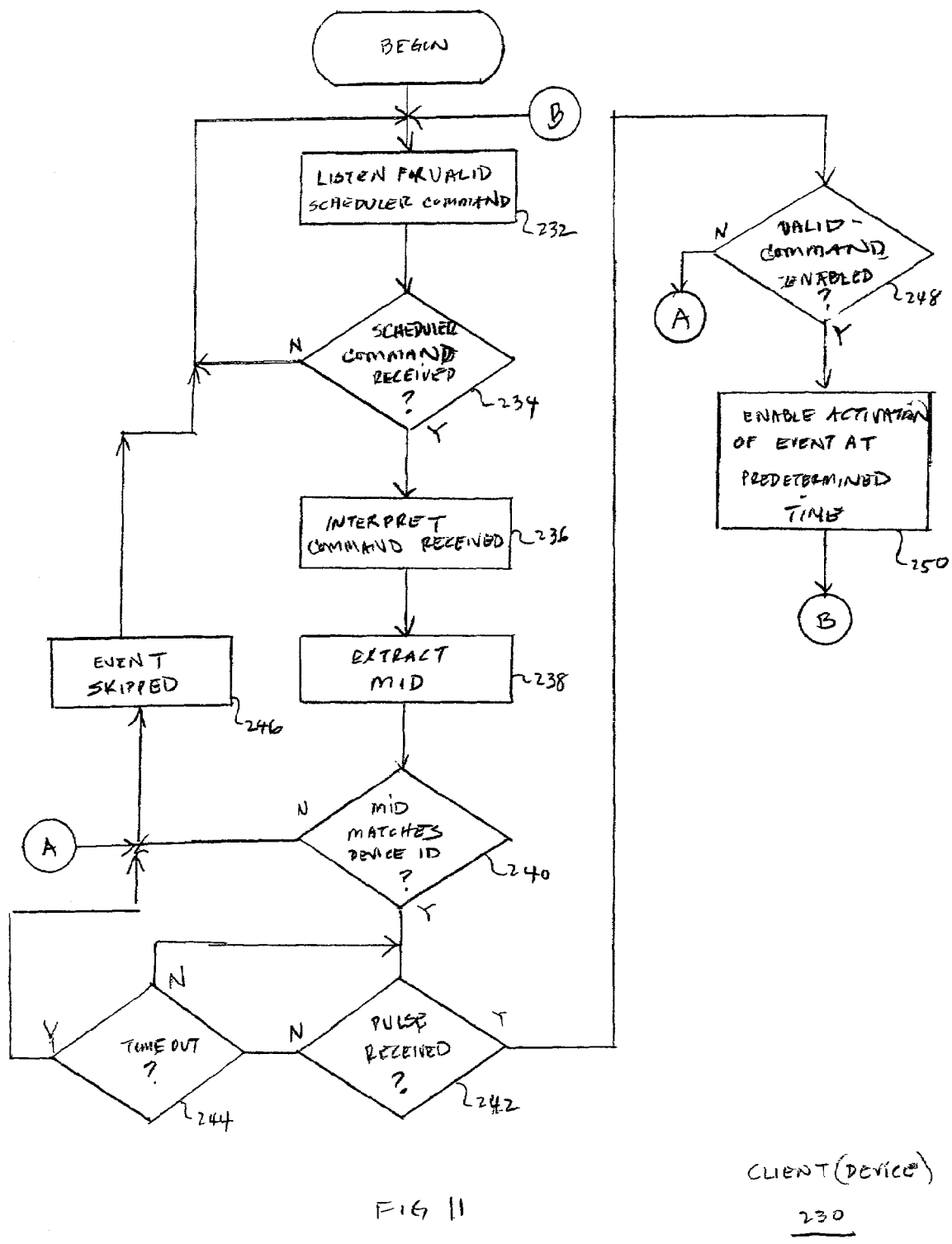
FIG. 11 is a flow chart of one embodiment of an exemplary process that the client devices are capable of performing.

Referring to FIG. 10, the host device 18A performs a general process 210 that will be described below. During the operation of the host device 18A, the host device initializes 212 parameters, and allows the controller 14 or user to load 214 the predetermined scheduling data into the event register file 38A. The host device 18A will also enable 216 its indicators (e.g., counters) and an operational cycle. This can include the following tasks.

schedule events by stopping the clock counter, modifying the event register file 38A, and resuming the activation of the counters. The bit representing the Counter Enable (CTEn) signal 154 allows the counting activity to be paused. When a zero (0) is written to the bit for CTEn signal 154, the clock counter 76 holds the current clock count until reset or resume operations are initiated. To resume counting, a one (1) can be written to the bit representing the CTEn signal 154. After a reset of system 10 occurs, like for example in step 216, the bit for the CTEn signal 154 can be set to zero (0) to pause the counting operation.

Additionally, step 216 in FIG. 10 may include the following. The bit for the Counter Reset (CTRst) signal 156 can be activated to reset the clock counter 76. When a one is written to the bit for the CTRst signal 156, the clock counter 76 can be reset to zero (0) immediately. After a WRITE operation, the clock counter 76 begins counting from zero immediately.

The "time count" (i.e., time-stamp determined by the clock cycle) of the first event command 88 to be activated is stored 218 in the current event indicator 80. The current event indicator 80 can be implemented as a pointer to the event register file 38A, indicating the current event. The value of the current event indicator 80 is preferably read at any time. According to one embodiment, the current event (corresponding to one of the predetermined event commands 88 stored in the event register file 38A) is not accessed when the clock counter 76 is not running (e.g., when the bit representing the CTEn signal 154 is zero (0)) in order to service the loading of data, the testing of the host device, or the reading of data from the host device. Doing so assures quality control of the order of control bus access and event loading. Table 6 lists an exemplary bitmap of a 16-bit register for the current event indicator 80.

TABLE 6

Bitmap of Current Event Indicator

| D15 | D14 | D13 | D12 | D11 | D10 | D9 | D8 | D7 | D6 | D5 | D4 | D3 | D2 | D1 | D0 |
| --- | --- | --- | --- | --- | --- | --- | --- | --- | --- | --- | --- | --- | --- | --- | --- |
| dc | dc | dc | dc | dc | dc | dc | Dc | E7 | E6 | E5 | E4 | E3 | E2 | E1 | E0 |

The clock counter 76 is programmed to operate continuously, that is, to increase sequentially with each clock. In certain situations where the counting activity must be paused by the controller 14, a mechanism is needed to temporarily stop the counting activity. Examples of such situations where the controller 14 pauses counting, include by way of example, the controller 14 preloading predetermined scheduling data into the event register file 38A; and changing the The time count is continuously compared with the current clock counter 76 until the current clock indicates the time to trigger 220 the event, that is, a match with the time-tag 90 associated with the current event. When a match occurs 220, the event command 88 is transmitted 222 as the schedule command 54 from the host device 18A, along with a valid command pulse 56 to all of the devices 20. Thereafter, the next event in the event register file 38A becomes 224 the current event to be activated. Although the time count may range from 0 to 4095 as previously described for a particular implementation, in video processing applications, since many of the operations are performed in a macro block operation cycle, typically being about 2400 master clocks, the clock counter 76 can be set to the maximum time count in the range from 0 through 2500. It will be appreciated by those skilled in the art that this range is programmable and provided by way of example. One advantage of the clock counter 76 including the capability of being programmable is that the operations of the scheduler system 10 do not need to be interrupted in order to modify event commands and time-stamps. For example, the following Table 7 indicates exemplary values for the time-tags 90 and event commands 88. In the situation where a time count is to be activated later than time 2500, this is an example of the clock counter 76 being outside of the predetermined range associated with the operational cycle; accordingly, such event command should not be activated (e.g., skipped).

TABLE 7

| Event Time Count | | | | | | | | | | | |
|---|---|---|---|---|---|---|---|---|---|---|---|
| E11 | E10 | E9 | E8 | E7 | E6 | E5 | E4 | E3 | E2 | E1 | E0 |
| T11 | T10 | T9 | T8 | T7 | T6 | T5 | T4 | T3 | T2 | T1 | T0 |

In the described embodiments, reference has been made to the next event being determined in turn according to an adjacent event stored in the schedule storage element 38 in sequence. Typically, the current event is equated with the next event stored in the schedule storage element 38 according to increasing time-tags. It will be understood that although the predetermined scheduling data stored in schedule storage element 38 may be accessed sequentially in this manner, in addition, the (scheduler) host device 18 may be programmed to determine the next current event according to a predetermined order. Such a feature will enable the host device 18 to select certain event commands and to skip others.

As the clock counter 76 counts to the maximum value, it preferably returns to zero when starting another operational cycle. Additionally, the clock counter 76 can be reset, paused, resumed, and loaded with a new value on-the-fly. The clock counter 76 is designed to operate when the bit for the CYEn signal 158 is set (e.g., to one (1)), counting from zero (0) up to the value of the maximum count, indicating the end of the operational cycle. Upon reaching the maximum count, the clock counter 76 is reset to zero and continues counting for the next operational cycle. If the bit for the CTRst signal 156 is set when writing to the scheduler command controller 66, the clock counter 76 is reset to zero (0). Preferably, the value of the clock counter 76 can be read at any time. Additionally, the clock counter 76 may be updated with a new value when the counter is not running, that is, when the bit for the CTEn signal 154 is zero (0).

As will be understood from the discussion herein, it is not necessary for the scheduler 18A to decide which event command 88 is to be performed on which specific device 20. Rather, the devices 20 perform a general process 230 that causes the event to be activated, and that will be described in connection with the flowchart of FIG. 11. The event commands 88 are posted on the scheduling command bus 26, 30 to activate various operations (events) on various devices 20 that use the scheduling command bus 26, 30 to synchronize their behavior. Each device listens 232 for the event command 88 to be broadcasted from the host device and transmitted to all of the devices 20, shown as VALID in FIG. 13 on the Sch_command line 54. The device 20 functions like a client device of a (master) host device 18A. Once the event command is received 234, wherein the event command 88 includes the MID 92, the devices 20 interpret 236 the event command 88 in order to determine whether the transmitted event command 88 is intended for such devices. One manner of accomplishing this is by the device extracting 238 the MID 92. Each device is enabled to match 240 the MID 92 with a predetermined, device-specific identifier.

In those situations where the clock counter 76 is larger than the time-tag of the current event, a mismatch occurs. For example, an error may occur in the reprogramming of the controller 14, thereby resulting in the scheduler 18A being slated to broadcast an event command 88 for a time count out-of-range with the maximum count indicator 82 in the operational cycle. When this situation arises, comparator 68 can be used to avoid this type of mismatch by comparing the time-tag of the current event with the clock counter 76. By doing so, comparator 68 can enable events to be skipped until the clock counter 76 is detected to be smaller than the time-tag of the current event. Alternatively, the detection of the clock counter 76 being larger than the time-tag could be used to trigger the event enable register bit 96 to disable such event.

Comparator 70 outputs a valid signal when the clock counter 76 matches with the time-tag 90 of the current event 80. When the match occurs, comparator 70 outputs 240 the time-tag 90 of the current event 80 to buffer 74. Buffer 74 holds the event command 88 and time-tag 90 that is intended to be broadcasted to the devices 20, until this data can be placed onto the tristate bus 26, 30. When the pulse is detected 242 by the device as indicated by the Valid_command 56 pulse in FIG. 13, the device determines 248 that a valid command is enabled, and causes 250 the event command to be performed. Referring back to 242, should the valid command pulse not be received within a pre-specified time, the process will time-out 244 and skip 246 the event.

Referring back to Table 2, to access one of the 128 events, representing the total number of events, the event number should be written to the bits, Ev0 to Ev6. To WRITE the event register file 38A, the Write/readj (wrj) bit is set to one (1) after loading the register representing the schedule data element 60. Otherwise, the wrj bit should be set to zero (0).

The maximum count indicator 82 is used to specify the maximum count number of an operational cycle. The clock counter 76 automatically restarts from zero when it counts toward a value stored in the maximum count indicator 82. The maximum count indicator 82 can be implemented as a register, which is read and written from the scheduler command bus 26 at any time. The register representing the maximum count indicator 82 is set to zero (0) after system 1 is reset, and is programmable, that is, it can be modified on-the-fly. According to one embodiment, the maximum count indicator 82 is accessed when the clock counter 76 is not running, for example, when the bit for the CTEn signal 154 is zero (0), in order to avoid interrupting the operational cycle. This indicator 82 accepts new maximum count values loaded by a user or from some external device (e.g., host 1410 of FIG. 17) prior to enabling the operational cycle of system 10, that is with the bit for the CYEn signal 158.

The access state machine 62 handles possible conflicts that arise when the controller 14 attempts to update the event register file 38A contemporaneously with the event register file 38A being accessed by the current event indicator 80. In such situations, the current event indicator 80 should be given the higher priority.

Control Bus Signals

In general, a bus interface unit (BIU) buffers bus signals between the devices and the control bus. According to the READ protocol, data is latched from the bus at a designated clock. According to the WRITE protocol, data should be put on the bus at a designated clock. Table 8 list various signals and their definitions.

TABLE 8

| | Control Bus Signal Definitions |
|---|---|
| Ctrl_addr 42 | c-bus address, full address [bits 14:0] |
| Ctrl_rd 46 | c-bus read signal |
| Ctrl_ale 52 | c-bus address latch enable signal |
| Ctrl_we 50 | c-bus write enable signal |
| Ctrl_data 44 | tristate Data of the c-bus |
| Ctrl_io_ready 48 | signal indicating that the I/O cycle has finished |
| last_transfer | indicates a last transfer of the current burst |
| dev_sel | device selected |

Figure 12:
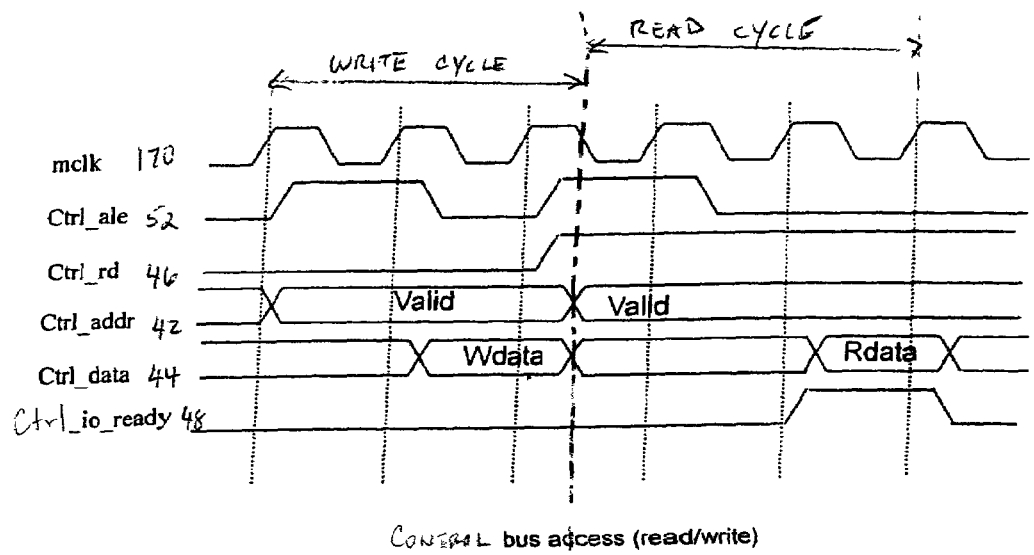
FIG. 12 is a timing diagram of various control bus access signals in accordance with one aspect of the present invention.
Figure 13:
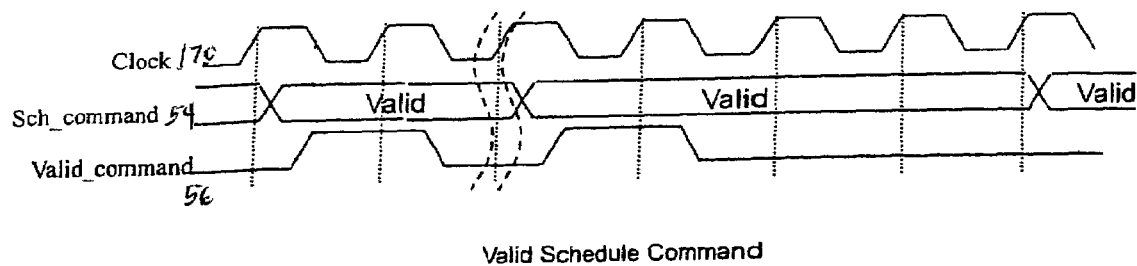
FIG. 13 is a timing diagram of a schedule command and valid command signals in accordance with one aspect of the present invention.

Referring to FIGS. 12–13, the control address (Ctrl_addr) signal 42 indicates the full address using 15-bits, namely 14:0. The Ctrl_rd signal 46 has a value in the Ctrl_ale 52 cycle that indicates the type of the I/O cycle. For example, if the Ctrl_rd signal 46 is valid, the I/O cycle will be a READ. If the Ctrl_rd signal 46 is not valid, the I/O cycle will be a WRITE. The Ctrl_ale signal 52 is an address validation signal, wherein a valid Ctrl_ale signal 52 indicates that a current cycle in an address latch enable cycle. In a control bus WRITE cycle, the Ctrl_we signal 50 will be set to valid by the data bus controller within the same clock (i.e., 302 phase in FIG. 14) with WRITE data. Devices 20 can use the Ctrl_we signal 50 to latch the WRITE data. The Ctrl_data 44 indicates the tristate data of the control bus, which is 16-bits by way of example. The Ctrl_io_ready signal 48 is driven by the accessed device. The device 20 can hold this signal invalid until the READ data is completed. In the WRITE cycle, the I/O will finish in two clock phases, whereupon this Ctrl_io_ready signal 48 is then ignored.

The last_transfer signal and device selected (dev_sel) signals are further described in in commonly-assigned copending U.S. patent application Ser. No. 11/303,115, entitled "Multiple Channel Data Bus Control for Video Processing", by Sha Li, et al., filed on Dec. 16, 2005, the subject matter of which is herein incorporated by reference it its entirety.

Control Bus Protocol

Figure 14:
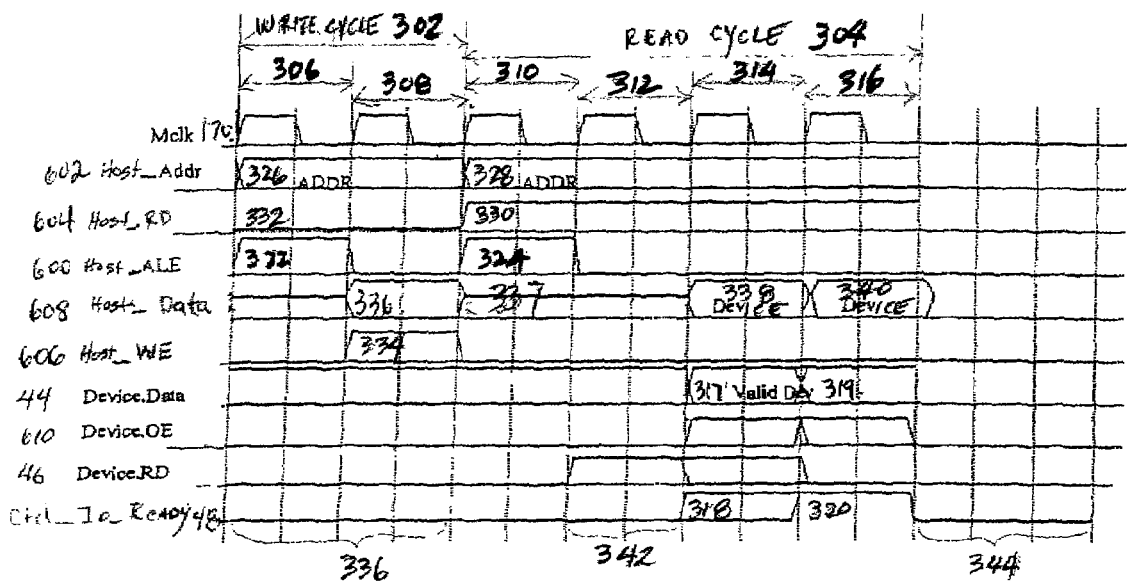
FIG. 14 is a timing diagram of the scheduling communication of the scheduler system in accordance with an aspect of the present invention.

Reference is now made to the timing diagram 300 of FIG. 14 to describe the control bus protocol. Throughout FIG. 14, reference will be made to a "host device", representing the bus and interrupt controller 14 which is functioning as a master device communicating with the various "client devices" in the nature of the devices 20. The control bus protocol includes a WRITE cycle 302 and a READ cycle 304. Each of these cycles 302, 304 can be further divided into phases as described below.

For a WRITE cycle 302, the first phase is generally an address phase 306. Following the address phase 306 is the data phase 308. For single word WRITE operations, there is typically one data phase 308. By contrast, for a burst word operation, the total number of data phases 308 can be four, eight, sixteen, all typically ending the WRITE cycle 302 with a valid last_transfer signal.

For a READ cycle 304, the first phase is an address phase 310. Following this address phase 310 are data phases 312, 314, 316, where a corresponding client device 20 will drive data 317 with an active 318 (valid) Ctrl_io_ready signal 48. Alternatively, the device 20 can drive data 319 with an active 320 Ctrl_io_ready signal 48. This indicates that the device 20 is capable of driving the Ctrl_data signal 44 at one or more of the data phases 317, 319 as shown in FIG. 14. Although only a few data phases 312, 314, and 316 are shown in FIG. 14, it will be appreciated that with the READ cycle 304, there can be one, four, eight, and sixteen data phases, by way of example, all typically ending the READ cycle 304 with an active last_transfer signal transmitted from the device 20.

The address phases 306 and 310 in the respective cycle are each indicated as being valid 322, 324, respectively, based on the host address latch enable (Host_ALE) signal 600 from the bus and interrupt controller 14. The Host_ALE signal 600 is valid 322, 324 preferably for one clock phase. In the address phases 306, 310 of the READ, WRITE cycles, respectively, the devices 20 drives 326, 328 the address bus (Host addr) 602 for the input or output (I/O) address that the respective READ cycle 302 or WRITE cycle 304 will access. The device 20 also indicates whether the cycle 302, 304 is a READ or a WRITE cycle, respectively, by asserting a data bus READ (Host_Rd) signal 604. If the Host_Rd signal 604 is a logical 1, as indicated by 330, the I/O cycle is deemed to be a READ cycle 304. Otherwise, if the Host_Rd signal 604 is a logical 0, as indicated by 332, the I/O cycle is deemed to be a WRITE cycle 302. If the I/O cycle is a WRITE cycle 302, device 20 will drive the host write enable (Host_WE) signal 606 to be valid 334, as well as WRITE data 336 onto the Host_Data line 608, which typically is a tristate bus. The device 20 is capable of buffering the WRITE data 336 and will complete this operation in the next clock 310. In the situation where a burst WRITE occurs, the WRITE cycles 302 are preferably consecutive, and the starting address is preferably aligned. The device 20 typically ignores 336 the Ctrl_io_ready signal 48 during a WRITE cycle 302. The Device.OE signal 610 represents an operational enable signal indicating that the client device is operational.

In the data phase (e.g., 314) of a READ cycle 304, the device 20 addressed will drive the READ data 338 onto the tristate data bus, along with a valid Ctrl_io_ready signal 48. The device 20 may similarly drive the READ data 340 on the data bus in another data phase 316 along with a corresponding valid 320 Ctrl_io_ready signal 48. It follows that a data phase 312 occurring with an invalid Ctrl_io_ready signal 342, 344 should preferably be deemed as an invalid data phase. The device 20 can then use the invalid 344 Ctrl_io_ready signal 48 to hold the READ cycle 304 for up to the maximum number of clocks in the cycle (e.g., 15 clocks). Any delay larger than this maximum number should cause a time-out I/O error in the device, which can be treated as a non-recoverable hardware interrupt, to which a global reset should be undertaken. In the situation of a burst READ cycle, the data phases may be four, eight and sixteen phases, either consecutive in one embodiment or non-consecutive in an alternate embodiment. Preferably, the starting address is aligned.

Host Bus Interface Unit for Bus and Interrupt Controller

Referring back to FIGS. 7 and 14, the operation of the exemplary implementation of a host BIU 32A, that is a part of the bus and interrupt controller 14, will now be described. Both the READ cycle 302 and WRITE cycle 304 are preferably initiated by the controller 14, upon which controller 14 will take ownership of the control bus 26. Both the READ and WRITE cycles 302, 304, respectively, are preferably non-interruptible in the controller 14, that is, once the controller 14 issues 322, 324 an ALE signal 600, there should be a guarantee that the WRITE cycle 302 and the READ cycle 304 should each end in their corresponding predetermined number of phases.

By way of example, if the WRITE cycle 302 has two phases, and the READ cycle 304 has three phases, in the WRITE cycle 302, the host will first drive 322, 326 the ALE signal 600, W/R# signal 610, and the Addr signal 602. The ALE signal 600 will be valid 322 for one clock. The W/R# signal 610 and Addr signal 602 will be valid 326 until the next cycle (whether it is a READ or WRITE) begins with another ALE signal 600. In the next cycle, the host 18A will drive 334 the WE signal 606 valid, and drive 336 the data 608 onto the data bus 22 for one clock. Because the controller 14 will release 337 the data bus in the next clock, the addressed device 20 must latch the data in this clock. The WRITE cycle 302 ends at the clock, 310.

The READ cycle 304 includes outputting 328 the address 602, indicating 330 the cycle type being a READ cycle, waiting for one clock 312, and loading 338 the host input data register 104.

Both the READ and WRITE cycles are preferably uninterruptible, and after these operations, the data in the output data register 102 is already written to the client device 20. The input data register 104 holds the data read from the device 20. Because after a READ cycle 304, the controller 14 may be interrupted before it uses the data in the input data register, the interruption service should preferably save (e.g., push) the input data register, and restore it upon return from the interrupt.

Figure 15:
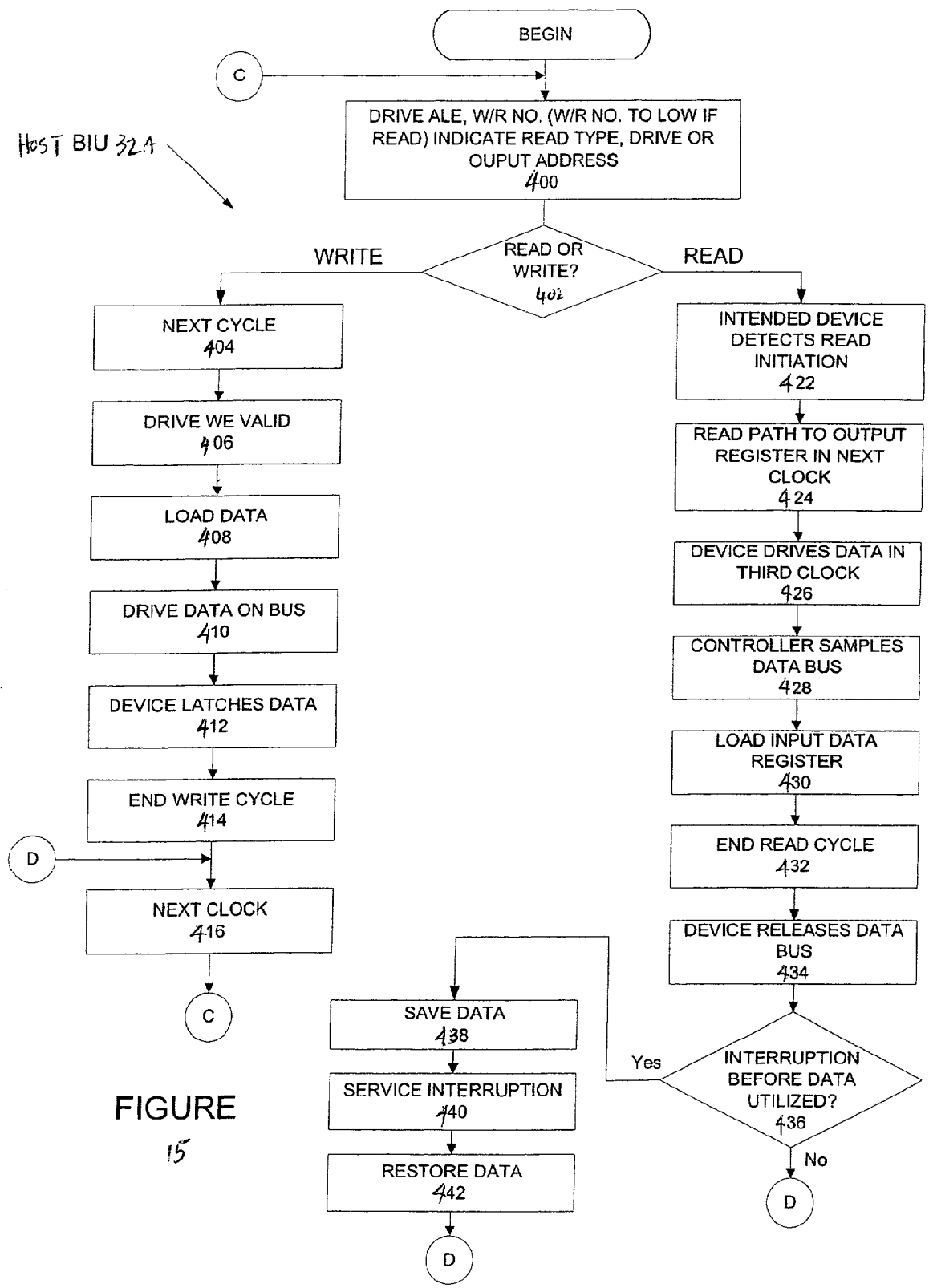
FIG. 15 is a flowchart of one embodiment of an exemplary process that the host device is capable of performing in accordance with an aspect of the present invention.

Referring the to the flowchart of FIG. 15, the details of the exemplary host BIU 32A will now be described in further details. In general, each cycle is typically initiated by the host device 14. This entails the negotiation between controller 14 and the devices 20 for control and ownership of the command bus 26, and may be implemented by an arbitration process.

Each WRITE cycle comprises two cycles, and each READ cycle comprises three cycles. Both the WRITE and READ cycles are preferably non-interruptible by the controller 14, that is, once the controller 14 has issued an ALE signal 600, this guarantees that the WRITE cycle will end in the next cycle, and that the READ cycle will end in the third cycle. In the WRITE cycle, the host device 14 is enabled first to drive 400 the ALE 600, Write/Read number 610 and address 602 signals. The ALE signal 600 should preferably be valid for one clock. In the WRITE cycle, the host device 18A provides the output address 602, and detects 402 the cycle type being a WRITE. The Write/Read number 610 and address 602 should be valid until the next cycle (READ or WRITE) begins with another ALE signal 600. In the next cycle 404, the host device 18A is enabled to drive 406 the WE signal 606 valid. The output data register 102 is loaded 408. The host device 4 drives 410 the data 608 onto the data bus 22 for one clock. Because the controller 14 will release the data bus 22 in the next clock, the addressed device 20 must latch 412 the data in the present clock. The WRITE cycle ends 414 after the present clock, with a next clock 416.

In the READ cycle, the host device 18A is enabled first to drive 400 the ALE 600, Write/Read number (W/R#) 610 and to generate the address signals 602. In the READ cycle, the host device 18A provides the output address 602, and the cycle type is determined 402 as being a READ cycle. The addressed device 20 will detect 422 that the host device 18A is initiating a READ cycle after decoding. The addressed device 20 can then read 424 the data 44 from the destination register 114 (e.g., SRAM) to the device output data register 102 in the next clock. In the third clock, the device 20 is enabled 426 to drive the data bus 22 with the output data register 102, and the controller 14 will sample 428 the data bus 22 in the same clock. The host device 18A awaits one clock and then loads 430 the input data register 104. After the third clock, the READ cycle ends 432, and the device 20 is caused to release 434 the data bus 22.

Both the READ and WRITE cycles are preferably uninterruptible in the host device 18A. After these operations, the data in the output register 102 is already written to the device 20. The input data register 104 holds the data read from the device 20. After a READ cycle, there is the possibility that the programs may be interrupted 436 before utilizing the data in the input register 104. Accordingly, the interruption service program preferably saves 438 (e.g., pushes) the input register 104, services the interruption 440, and restores 442 the input register 104 upon returning from servicing the interruption.

Device Bus Interface Unit

Referring the to the flowchart of FIG. 16, the details of the exemplary device BIU 34A will now be described in further details. In general, each device 20 is normally in an IDLE mode 510, and the Host.ALE signal 600 is sampled 512 during this state. In IDLE mode, the device 20 should sample the Host.ALE signal 600 at every clock. If the Host.ALE signal 600 is active (e.g., high) 514, the device 20 should latch 516 the Host.Address 602, as indicated by the Host.WE signal 606; otherwise, at the next clock 518, the Host.ALE signal 600 should be resampled 512. After 516, during the next clock 520, the device 20 should decode 522 the address and combine such decoded address with the write enable/read data number (WE/RD#) to determine 524 if a READ or WRITE operation is expected. If a WRITE operation is expected (e.g., W branch of 524) and the Host.WE signal 606 is active 526 in the current clock, then the value on the data bus 22 at that clock will be latched 528 into the input device buffer 112 (e.g., a register). In the next clock 530, the data in the device buffer 122 is written 532 to internal registers not explicitly shown, but along signal path referenced as Data_from_Bus_WE 122 in FIG. 8.

Figure 16:
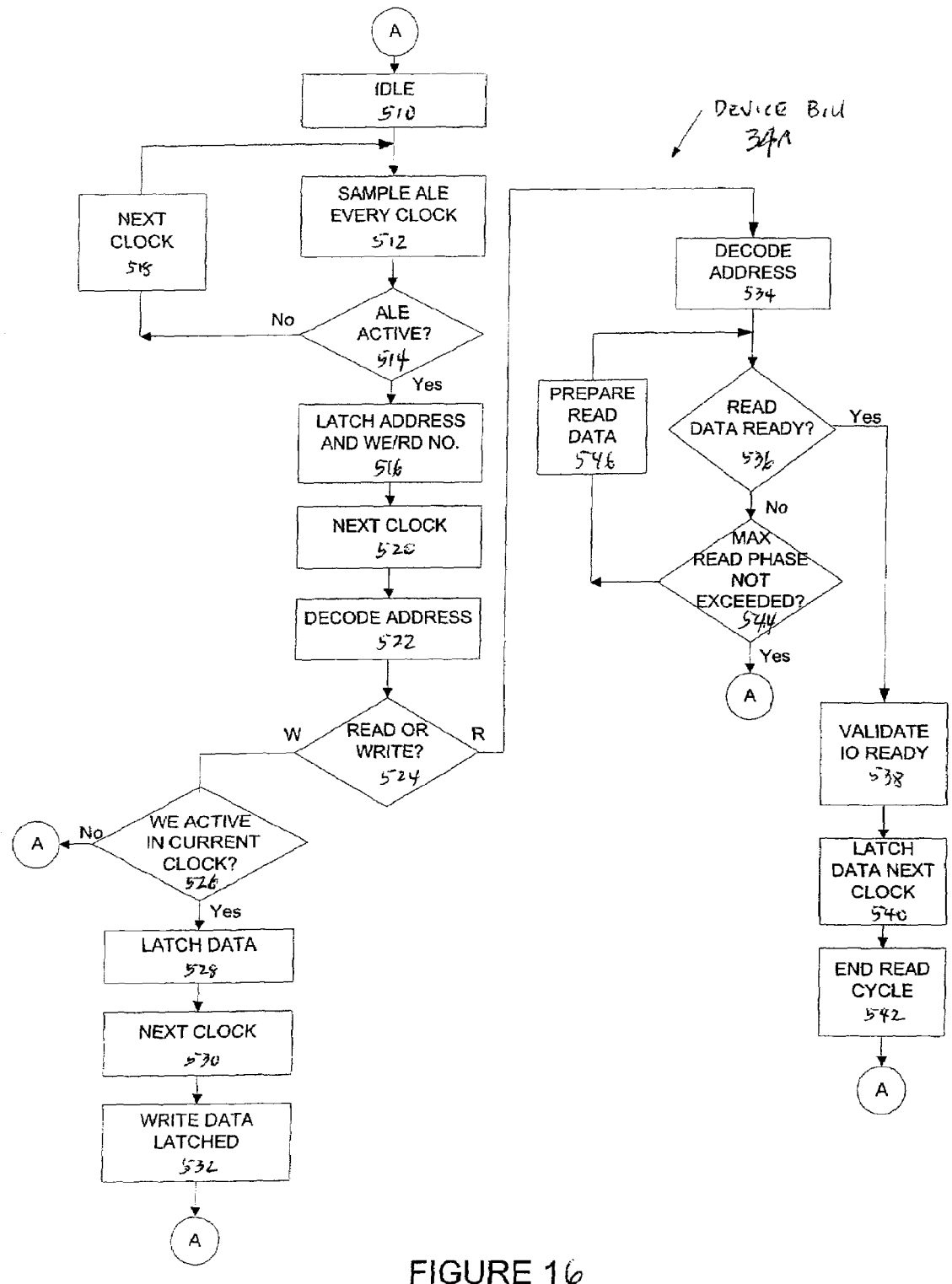
FIG. 16 is a flowchart of one embodiment of an exemplary process that the devices are capable of performing in accordance with an aspect of the present invention.

The device 20 then returns to an IDLE state 510 as indicated in FIG. 16. If there is no write enable signal 606 occurring after the address latch enable signal 600, the device 20 preferably should return to an IDLE state. A write enable signal 606 sampled while the device 20 is in an IDLE state should be ignored. If a READ operation is expected (e.g., R branch of 524), the internal register to be READ is decoded 534 by the address. The device 20 is capable of extending the I/O READ cycle by driving the IO ready signal 48 to an invalid state in order to enable the device 20 to have sufficient time to prepare the READ data 536. After the READ data is ready on the Data_to_Bus signal 124 (shown in FIG. 8) and stored in the device output buffer 114, the device 20 should drive 538 the IO ready signal 48 to a valid state. Accordingly, device BIU 34A latches 540 the READ data to the tristate data bus 22 in the next clock and the READ cycle should end 542. The device BIU 34A should then return to an IDLE state 510. If a valid write enable signal 606 is sampled during the READ cycle, it should be ignored because the write enable signal 606 should not be active in the same clock with the ALE signal 600 being active. In 536, if the IO ready signal 48 was not read, and a maximum read phase is not exceeded 544, more time is allotted to prepare the data 546 before attempting to read the data ready 536.

An Implementation of a Video Processing System Including the Scheduler System

FIG. 17 illustrates one implementation of the scheduling system 10 of the present invention applied to a video processing system 1400 in order to perform video compression of moving images as part of an encoding process. In the implementation of FIG. 17, system 1400 includes a processor-based platform 1402 (back end sub-system 1402), and a front end sub-system 1404. Data from source 1406 is received by an audio/visual (A/V) interface 1408. The front-end sub-system 1404 includes function blocks to provide the data processing method for video compression. The back-end sub-system 1402 provides the data and control information traffic as well as the overall control and scheduling for the function blocks of the front end sub-system 1404. The back end sub-system 402 also provides the communication and data stream output to the external host 1410.

The AV interface 1408 is synchronized with a pixel clock PCLK (not explicitly shown), which may be operating at a low frequency, like 27 MHz by way of example. A data (pixel) bus 1412 allows the transfer of pixel data from the source 1406 to the AV interface 1408. Every clock cycle, a pixel can be input through the pixel bus 1412 with a valid pixel signal. Those skilled in the art will recognize that the input timing can be controlled by horizontal and vertical synchronize signals. A control bus 1411 and a scheduler command bus 1413 communicatively couple the front end 1404 to the back end 1402.

The source 1406 may be a multitude of devices that provide a digitized video bit stream (data stream), like for example, from a Complementary Metal Oxide Semiconductor (CMOS) device or Charge Coupled Device (CCD) sensor (with or without glue logic) like that used in a digital camera and PC camera. Other types of source devices that may work suitably well with the present invention, include by way of example, the Philips® 711x video digitizer and processor chip. By way of background information, in a digital camera, CCDs can be analogized to operating like film. That is, when they are exposed to light, CCDs record the intensities or shades, of light as variable charges. In the field of digital cameras, the charges are converted to a discrete number by analog to digital converters. It will be recognized that other types of sources capable of generating a digitized video bit stream may work suitably well with the present invention, including sources in the nature of a personal video recorder, a video-graphics capture and processor board, and a digital CAM recorder.

In general, source 1406 generates an uncompressed video data bit stream 1414, which may be of multiple formats. By way of example, the format of data stream 1414 can comply with the CCIR (Consultative Committee for International Radio, now ITU-R) 601 recommendation which has been adopted worldwide for uncompressed digital video used in studio television production. This standard is also known as 4:2:2. Also, data stream 1414 may be the parallel extension standard, namely CCIR 656 with PAL and NTSC, which had been incorporated into MPEG as the Professional Profile. CCIR 656 sets out serial and parallel interfaces to CCIR 601. Other suitable video formats include: YUV 4:2:2 interlace; 8-bit YUV with Vsysnc/Hsysnc/Fodd or Vref/Href format, interlace and progressive; 10-bit RGB Bayer with Vsysnc/Hsync CMOS sensor format. The support size can vary from 352×288 to 720×480 (30 fps) or 720×576 (25 fps), while the support input frame rate can vary from 10 fps to 30 fps. It is noted that these values are provided by way of example, and that the invention is not limited to these formats and parameters, but may work suitably well with other types of formats and parameters. When data stream 1414 includes an audio component, the format of the data stream could also be in IIS (inter IC signal) format. Of course, the appropriate IIS data rates, which typically are at speeds of several Mbits/second, may be selected for transferring audio data. It will be appreciated that CCIR 656 and IIS are only examples of possible digital data formats, and that other formats are equally possible. A/V interface 1408 includes necessary ports and circuitry to receive the incoming (video and/or audio) signals and to buffer data from such signals.

The base platform 1402 is preferably a general microprocessor-based computing system. In one implementation, the electronics of platform 1402 are implemented as a single ASIC incorporating a processor 1416, a system controller 1418, memory device 1420, memory device controller 1422, a multichannel (e.g., Direct Memory Access DMA) controller 1424, an input/output (I/O) interface 1426, a scheduler host device 1428, and an extensible program interface 1430.

Exemplary applications suitable for the incorporation of system 1400 include digital video recorders, remote video surveillance systems, video capture boxes, small portable handheld devices such as digital cameras, multimedia-enabled cellular phones and personal digital assistants (PDAs), and other media-based devices and appliances. The (XRISC) bus and interrupt controller 1418 handles the workflow of the data and control signals for the computing processes of CPU 1416, including for example, handling hardware and software interrupts, as well as those I/O signals generated.

Memory device 1420 may be any suitable computer memory device for storing picture data, such as a video random access memory (VRAM) or dynamic RAM (DRAM) device, under the control of memory device controller 1422. Memory device 1420 is shown as being external to platform 1402 in FIG. 17, but may be integrated into platform 1402 in other embodiments of system 1400. In one embodiment where memory device 1420 is a DRAM, controller 1422 is selected to be a corresponding DRAM controller performing the physical transfers of data between the memory device 1420 and the multichannel controller 1424. In this embodiment, controller 1424 may be a DMA controller selected to accommodate any suitable number of DMA channels used to transfer the retrieved video data into packed pixel format or planar bit maps, for example, from the memory device 1420 to each data block for processing by the MEC engine 1432.

Extensible program interface 1430 enables data to be loaded into system 1400 from flash memory device 1434.

The video processing system 1400 includes several devices to be controlled by the scheduler host device 1428. These devices include MEC engine 1432, a compression engine 1436, a memory controller engine 1438, and the external host 1410. MEC engine 1432 includes a motion estimation and motion compensation array 1440, stream buffer 1442 and SRAM 1444. Compression engine 1436 includes a discrete cosine transform (DCT) and inverse DOT (IDCT) module 1446, a quantizer and dequantizer module 1448, a variable length coding (VLC) encoder 1450, and buffers such as block SRAMs 1452, 1454. Additional details of the video compression techniques for video processing system 1400 are disclosed in: (1) U.S. application Ser. No. 09/924,079, entitled "Cell Array and Method of Multiresolution Motion Estimation and Compensation," filed Aug. 7, 2001, issued as U.S. Pat. No. 6,970,509 on Nov. 29, 2005, the subject matter of which is hereby incorporated by reference in its entirety; and (2) U.S. application Ser. No. 09/924,140 , entitled "DCT/IDCT With Minimum Multiplication," filed Aug. 7, 2001, issued as U.S. Pat. No. 7,035,332 on Apr. 25, 2006, the subject matter of which is hereby incorporated by reference in its entirety.

In general, the scheduler host device 1428 generally functions as a timing mechanism enabling the scheduling and synchronization of operations and data transfers that are intended to be performed by particular ones of the devices 1432, 1436, 1438, and 1410, by way of example. Exemplary operations and data transfers can include performing motion estimation and compensation, discrete cosine transforms, inverse discrete cosine transforms, quantization, inverse quantization, video length coding encoding, direct memory access control, the loading of predetermined data and firmware by the external host 1410.

For example, where the MEC engine 1432 needs to share on-chip SRAM with other modules (e.g., DCT/IDCT 1446), programmable scheduler host device 1428 coordinates the operation of various modules and processes in system 1400 in a manner as already described. The commands issued by the scheduler host device 1428 as part of the back end sub-system enables the synchronization of devices, such as 1432, 1436, 1438, and 1410 to accomplish the video compression and encoding tasks. For example, in accordance with one embodiment of the present invention, MEC engine 1432 interfaces with an external DRAM 1420 to obtain picture data and to store processed picture data over databus 1412. Picture data read from the DRAM 1420 is received by the array 1440 from the SRAM 1444. The array 1440 is enabled to perform calculations on the data received, and because stream buffer 1442 functions as a programmable cache, contemporaneous with such array processing, additional data can be pre-loaded from DRAM 1420 into the SRAM 1444 for the next set of processing operations. Stream buffer 1442 thus enables the MEC array 1440 to perform motion estimation processing and when the array 1440 is not accessing the stream buffer 1442, the stream buffer can pre-fetch data from the memory device 1420 for the next MEC operations in parallel. The operations and data transfers necessary to accomplish the MEC processing are exemplary of the event commands and time-tags that can be controlled and synchronized by the scheduler host device 1428.

Those skilled in the art will recognize that the blocks of FIG. 17 are functional blocks that may be implemented either by hardware, software, or a combination of both. Given the functional description of these blocks, those of ordinary skill in the art will be able to implement various components described using well-known combinational and/or sequential logic, as well as software without undue experimentation. Those skilled in the art will appreciate that the present invention is not limited to the video compression system described above, but is applicable to any video processing system.

Figure 18:
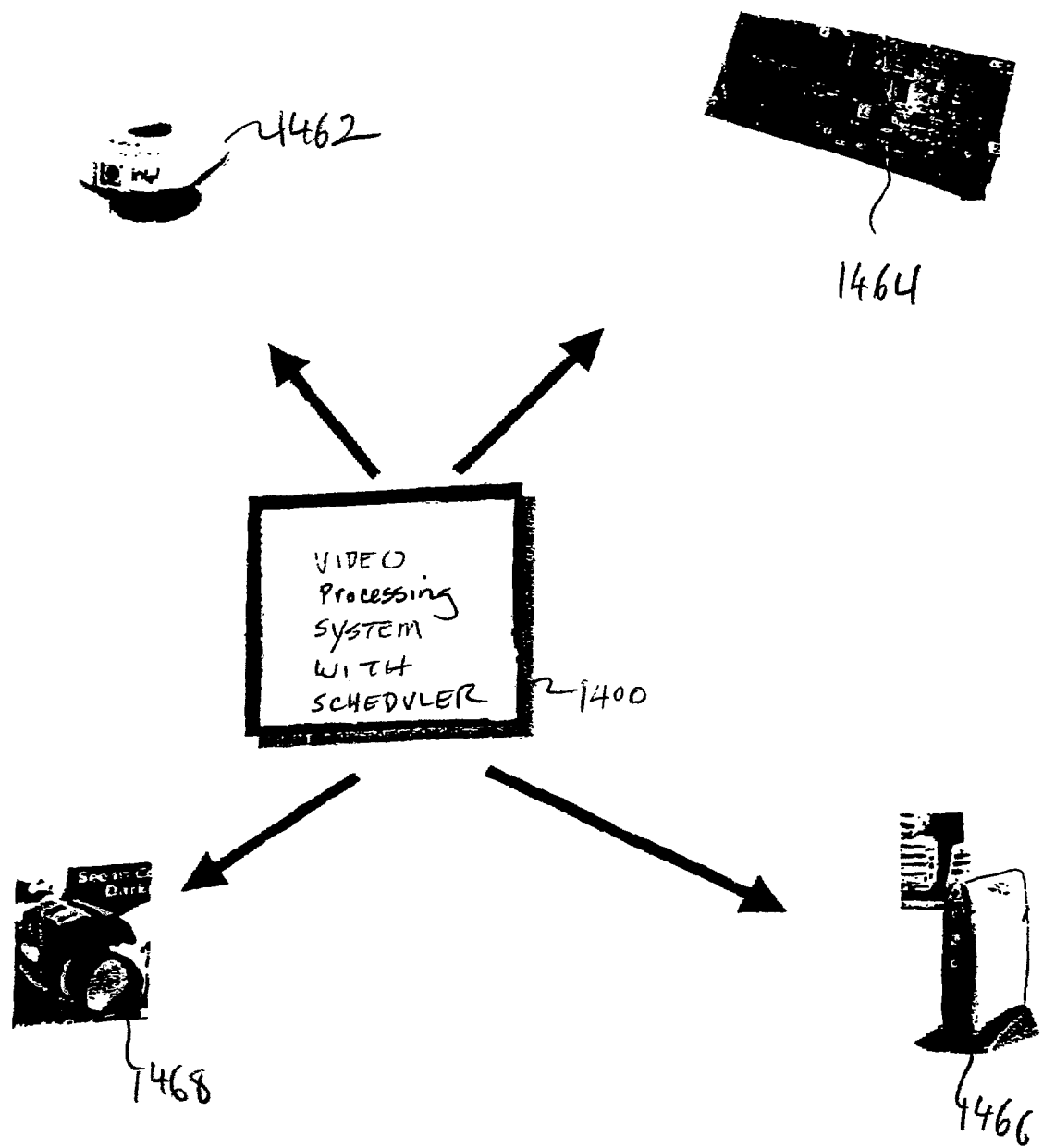
FIG. 18 is an illustration of various exemplary applications that work suitably well with the scheduler system in accordance with the present invention.
Figure 19:
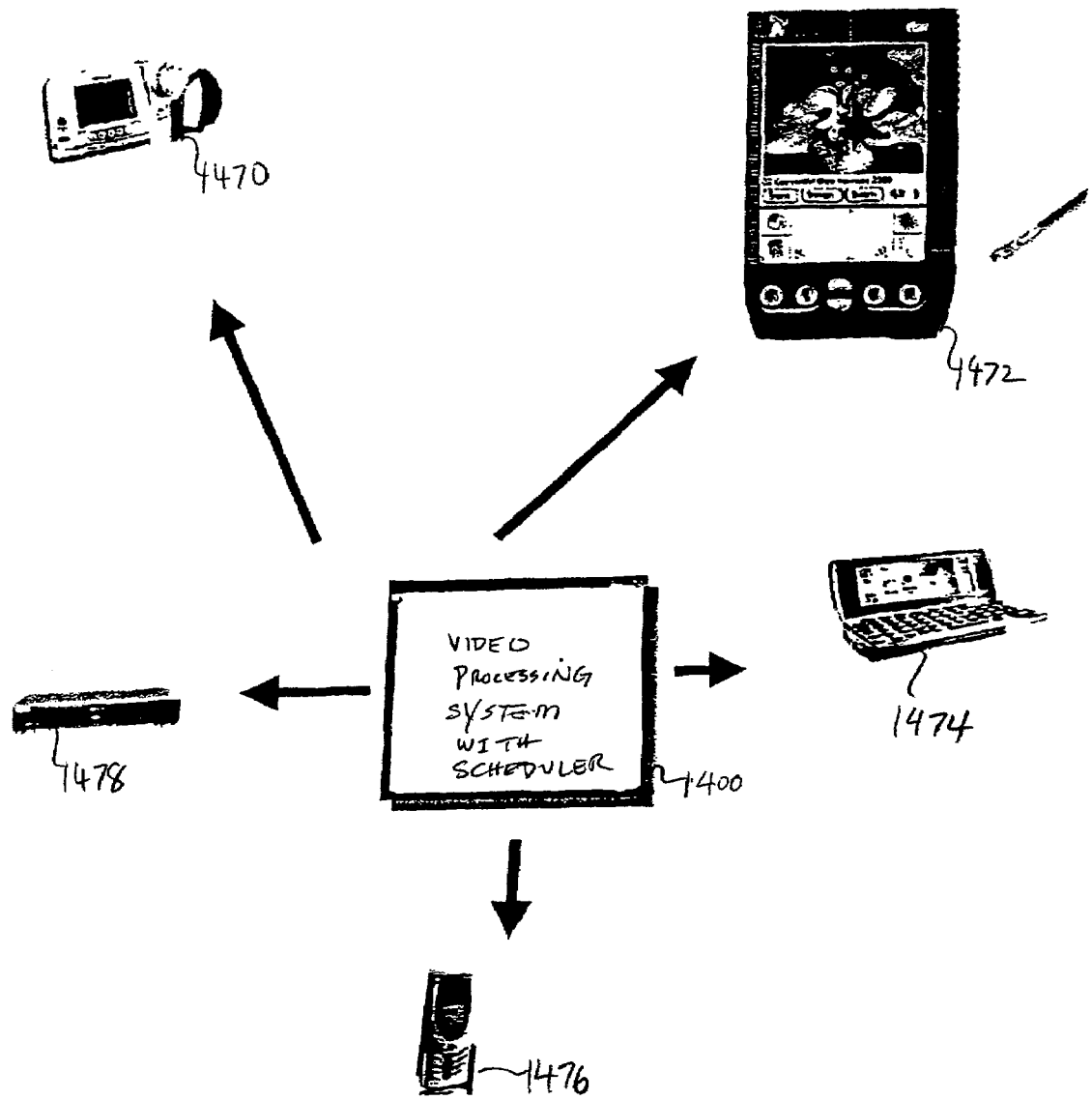
FIG. 19 is an illustration of additional exemplary applications of FIG. 18.

FIGS. 18–19 are illustrations of various exemplary video processing applications in which the video processing system 1400 incorporating the scheduler system 10 of the present invention will work suitably well. Such applications include a high quality PC video camera 1462 used for video conferencing or as a video recorder. Another application includes video capture boards 1464, which may be enabled with MPEG-1, MPEG-2, MPEG-4, H.263 and H.261 capability. Yet another application includes a video capture box 1466 which may be enabled with MPEG-1, MPEG-2, MPEG-4, H.263 and H.261 capability, by way of example. Video capture boxes 1466 can also be used for time shifting purposes. Still another application comprises an IP (Internet Protocol)-based remote video surveillance system 1468 outputting MPEG-1, MPEG-2, MPEG-4 or other type of video format.

In FIG. 19, other applications that are well-suited for video processing system 1400, include the following: (1) high quality video cameras 1470 with full D1 broadcasting quality; (2) personal digital assistants 1472 operable as a video camera or as a visual communication device; (3) mobile visual communication devices 1474; (8) portable wireless telephones 1476 enabled to operate with visual communication by MPEG-4 over CDMA; and (9) personal video recorders (PVRs) 1478 also known as digital video recorders (DVRs), along with other devices providing a home video gateway, visual conferencing and multimedia communication. It will be appreciated by those skilled in the art that the above-mentioned types of applications are only examples, and that the video processing system in accordance with the present invention works suitably well with a wide variety of applications. When the scheduler system 10 is utilized with such applications, it will be appreciated by those skilled in the art that appropriate modification of the system 10 should be made to be in compliance with the corresponding media-enabled portable wireless devices. For example, the present invention may be used with the appropriate wireless communication medium (e.g., radio frequency signals, infrared signals) for wireless transmission of signals.

With the present invention, the scheduler system 10 can be implemented with the particular hardware implementations described, by way of example. However, even though the scheduling system 10 has been described with respect to the specific architecture disclosed, it will be appreciated that the scheduler system of the present invention may work suitably well with other architectures of video processing systems. Further, the timing mechanism enabling the scheduling and synchronization of operations and data transfers intended to be performed by particular ones of the devices has a wider application than the video processing techniques described herein. Similarly, the application of the present invention is not limited to only performing the sequence of steps described in figures presented. Those skilled in the art will understand that the scheduler system 10 may operate suitably well with other sequences of steps and functions to provide data processing in other applications.

Although the invention has been described in considerable detail with reference to certain embodiments, other embodiments are possible. As will be understood by those of skill in the art, the invention may be embodied in other specific forms without departing from the essential characteristics thereof. Accordingly, the present invention is intended to embrace all such alternatives, modifications and variations as fall within the spirit and scope of the appended claims and equivalents.

What is claimed is:

1. A method of synchronizing control of one or more devices in a system during an operational cycle, comprising:
    retrieving data associated with a plurality of predetermined event commands to be performed by one or more of the devices in the operational cycle;
    associating a current event command in turn with the predetermined event commands; and
    responsive to the current event command being associated with a particular event command selected from the predetermined event commands, enabling one or more of the devices to perform the particular event command by transmitting a schedule command followed by a valid command to the devices, the valid command causing one or more of the devices intended to perform the particular event command, and the schedule command indicating a predetermined time for the particular event command to be performed, wherein the response to the current event command is unaffected by signal interrupts in the system, said schedule command being transmitted at a precise time.

2. The method according to claim 1, further comprising: initializing the operational cycle prior to retrieving data associated with a plurality of predetermined event commands.

3. The method according to claim 1, further comprising: selecting the current event command to be associated with a first of the predetermined event commands after retrieving data associated with a plurality of predetermined event commands.

4. The method according to claim 1, wherein retrieving data associated with a plurality of predetermined event commands to be performed by one or more of the devices in the operational cycle comprises:
reading the data from a memory; and
loading the data into the system.

5. The method according to claim 1, wherein retrieving data associated with a plurality of predetermined event commands to be performed by one or more of the devices in the operational cycle comprises:
accessing a device external to the system; and
loading the data into the system from the device.

6. The method according to claim 1, wherein retrieving data associated with a plurality of predetermined event commands to be performed by one or more of the devices in the operational cycle comprises:
retrieving a plurality of predetermined time-stamps each associated with corresponding ones of the predetermined event commands; and storing the time-stamps and the predetermined event commands in a memory.

7. The method according to claim 1, wherein retrieving data associated with a plurality of predetermined event commands to be performed by one or more of the devices in the operational cycle comprises:
loading a list of the predetermined event commands each being associated with a time-tag in increasing order.

8. The method according to claim 1, wherein retrieving data associated with a plurality of predetermined event commands to be performed by one or more of the devices in the operational cycle comprises:
loading a sequential list of the predetermined event commands each being associated with a time-tag.

9. The method according to claim 1, wherein associating a current event command in turn with the predetermined events comprises: determining whether the current event command matches in turn all of the predetermined event commands.

10. The method according to claim 1, wherein associating a current event command in turn with the predetermined event commands comprises:
determining whether the current event command matches in turn selected ones of the predetermined event commands.

11. The method according to claim 1, wherein associating a current event command in turn with the predetermined event commands comprises:
determining predetermined time-stamps from the data, each of the time-stamps being in increasing order and associated with a corresponding one of the predetermined event commands.

12. The method according to claim 11, further comprising:
measuring a clock time associated with the system;
causing the current event command to represent the clock time; and
matching the clock time with one of the predetermined time-stamps.

13. The method according to claim 11, wherein associating a current event command in turn with the predetermined event commands comprises:
recursively associating the current event command with each one of the predetermined event commands in sequence according to the increasing order of the time-stamps.

14. The method according to claim 1, wherein enabling one or more of the devices to perform the particular event command comprises:
responsive to the current event command being associated with the particular event command, transmitting at least one command to the devices.

15. The method according to claim 14, wherein a first command includes the particular event command and an identifier indicating one or more of the devices intended to perform the particular event command.

16. The method according to claim 15, wherein a second command includes a validation signal authorizing activation of the particular event command by one or more of the devices intended.

* * * * *